(12) United States Patent
Volckens et al.

(10) Patent No.: US 12,352,672 B2
(45) Date of Patent: Jul. 8, 2025

(54) METHODS AND SYSTEMS FOR AUTOMATED ANALYSIS OF AEROSOL SAMPLING FILTERS

(71) Applicant: Colorado State University Research Foundation, Fort Collins, CO (US)

(72) Inventors: John Volckens, Fort Collins, CO (US); Christian L'Orange, Fort Collins, CO (US); Gabriel Neymark, Golden, CO (US); Ellison Carter, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 722 days.

(21) Appl. No.: 17/670,204

(22) Filed: Feb. 11, 2022

(65) Prior Publication Data

US 2022/0260462 A1 Aug. 18, 2022

Related U.S. Application Data

(60) Provisional application No. 63/148,952, filed on Feb. 12, 2021.

(51) Int. Cl.
| | |
|---|---|
| *G01N 1/22* | (2006.01) |
| *G01N 21/3518* | (2014.01) |
| *B25J 9/16* | (2006.01) |

(52) U.S. Cl.
CPC ......... *G01N 1/2273* (2013.01); *G01N 1/2205* (2013.01); *G01N 21/3518* (2013.01); *B25J 9/1679* (2013.01)

(58) Field of Classification Search
CPC ............ G01N 1/2273; G01N 1/2205; G01N 21/3518; G01N 5/02; G01N 15/0618;
(Continued)

(56) References Cited

U.S. PATENT DOCUMENTS

| | | | |
|---|---|---|---|
| 6,736,017 B2* | 5/2004 | Mansky | G01N 3/02 73/159 |
| 2014/0044237 A1* | 2/2014 | Ferrer | B25J 7/00 414/815 |

FOREIGN PATENT DOCUMENTS

CN 109856025 A * 6/2019

OTHER PUBLICATIONS

Nunez et al., "Inline Infrared Chemical Identification of Particulate Matter", Sensors 2020, 20, 4193, pp. 1-14, Jul. 28, 2020 (Year: 2020).*

(Continued)

*Primary Examiner* — David Z Huang
(74) *Attorney, Agent, or Firm* — Faegre Drinker Biddle & Reath LLP

(57) ABSTRACT

Disclosed are methods and systems for implementing an automated air quality analysis system. The system includes: a sealed enclosure, a filter sample analysis system disposed within the sealed enclosure, and a controller operably coupled with the filter sample analysis system. The filter sample analysis system includes: an automated filter management system with filter samples and an articulating robotic arm which selects the filter sample for analysis, a filter weighing apparatus for weighting of the filter sample, and a primary chemical analysis apparatus for performing electromagnetic energy spectroscopy measurement on the filter sample. The controller operates the automated filter management system to transport the filter sample to the filter weighing apparatus and the primary chemical analysis apparatus, obtains data from the filter sample analysis system, and determines the type and amount of accumulated mass in the sample based on the weight and the spectroscopy measurement result.

31 Claims, 24 Drawing Sheets

(58) Field of Classification Search
CPC ............. G01N 35/00029; G01N 21/71; G01N 35/0099; G01N 21/31; B25J 9/1679
See application file for complete search history.

(56) References Cited

OTHER PUBLICATIONS

English Machine Translation of CN-109856025 A, translated online Nov. 2024 (Year: 2019).*

* cited by examiner

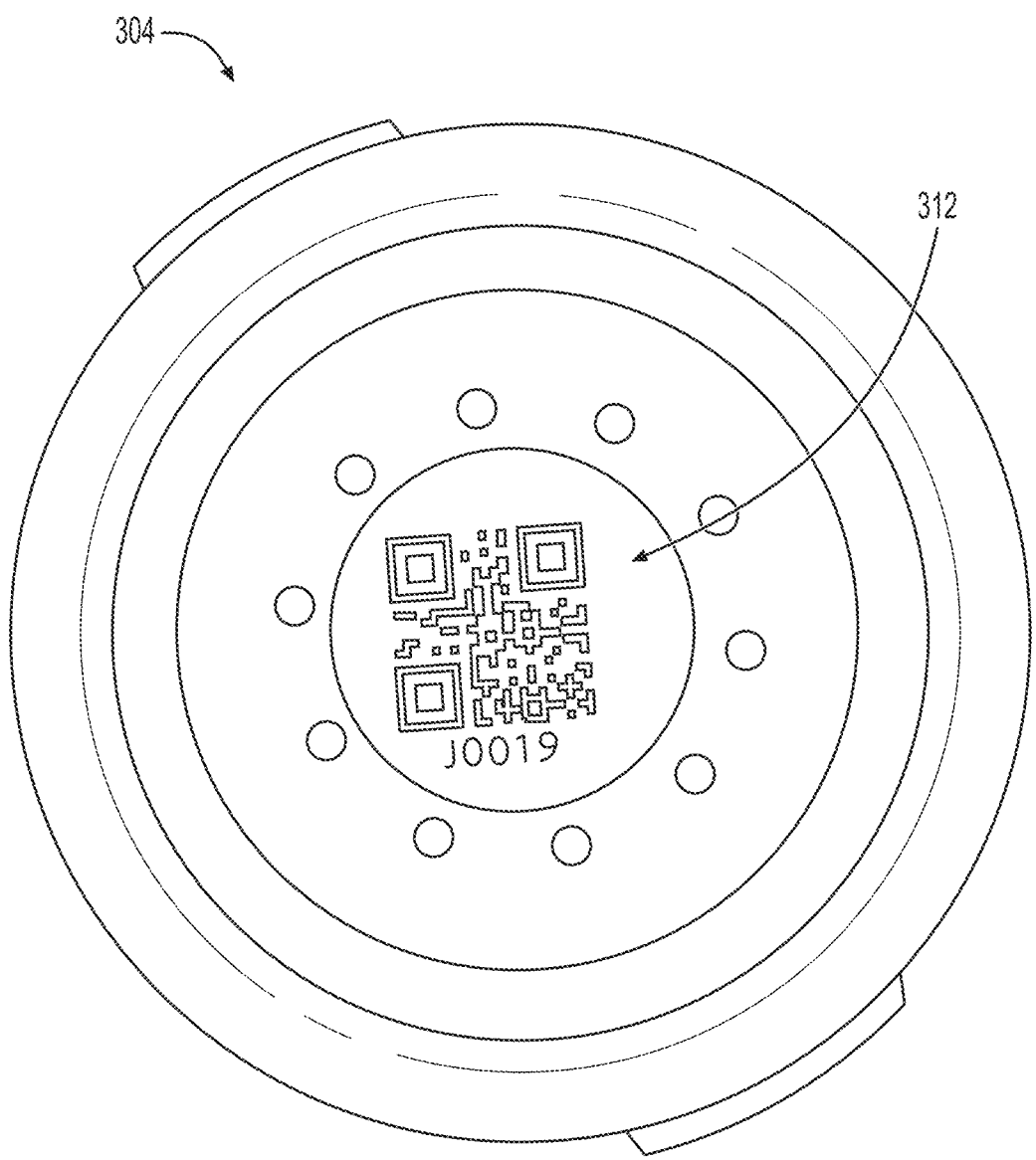

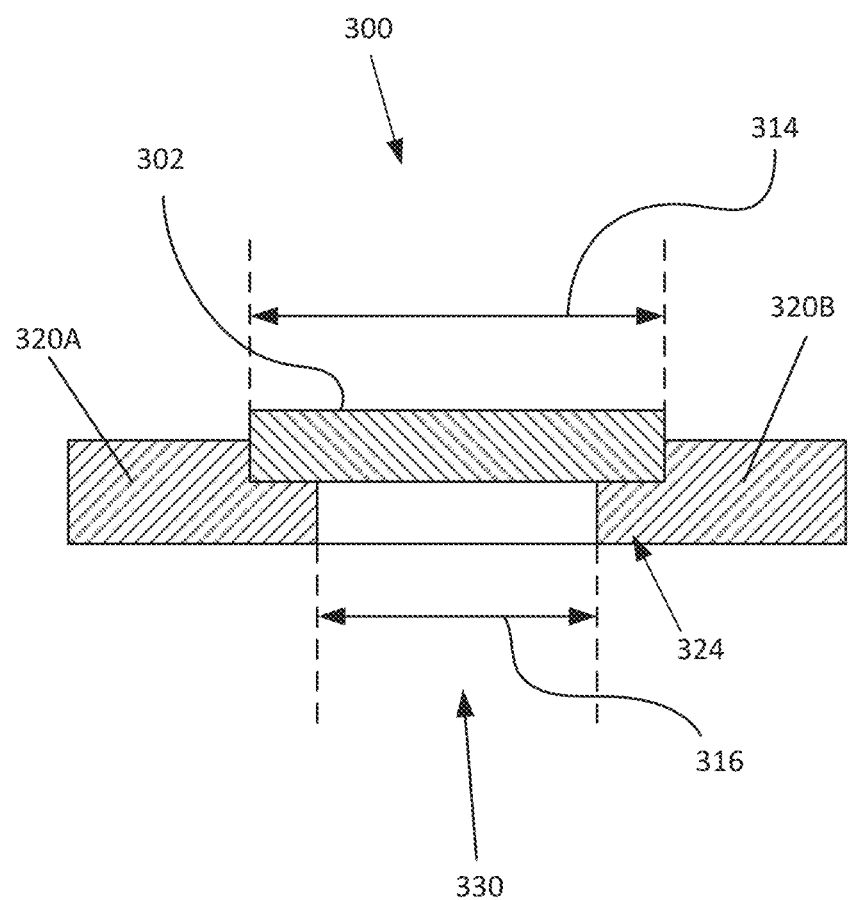

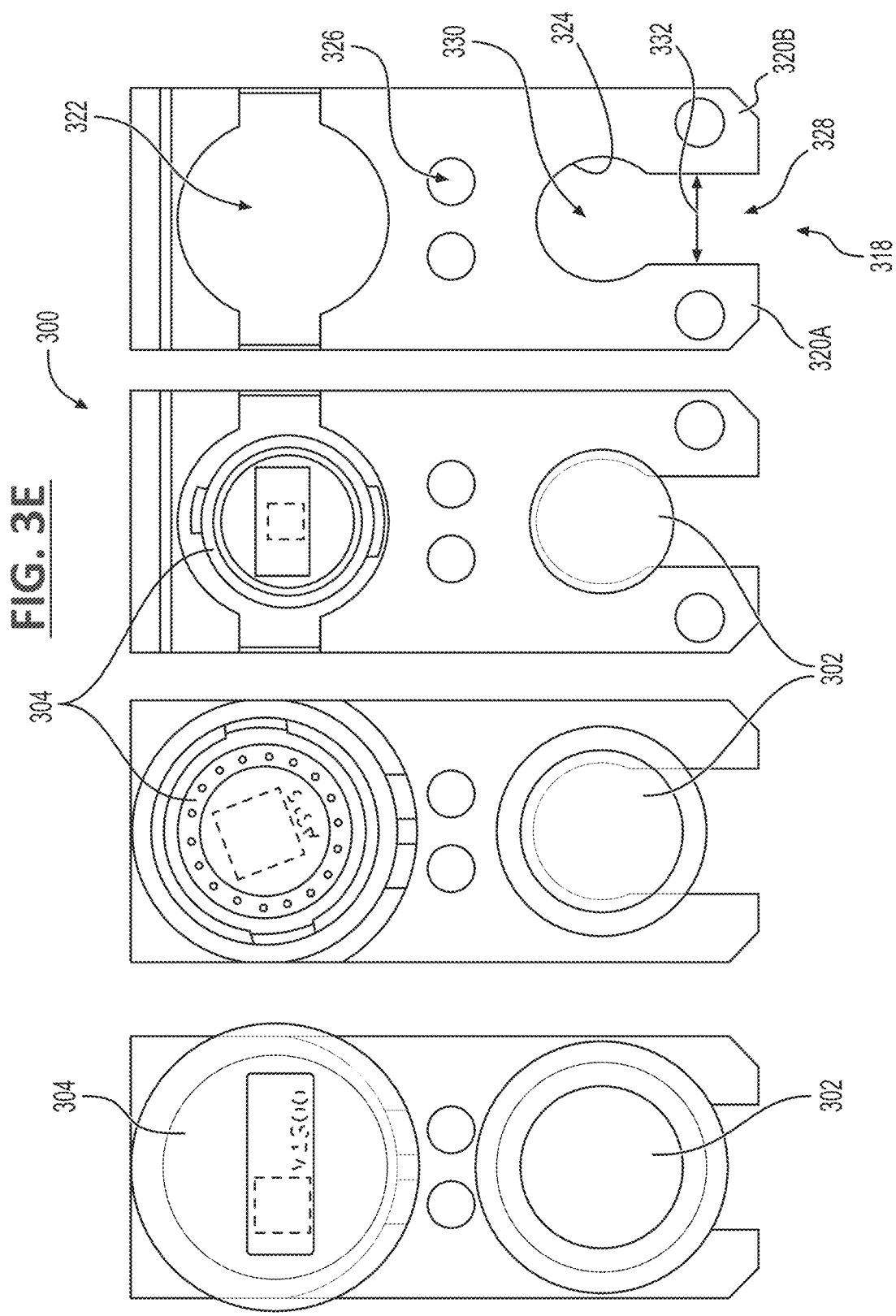

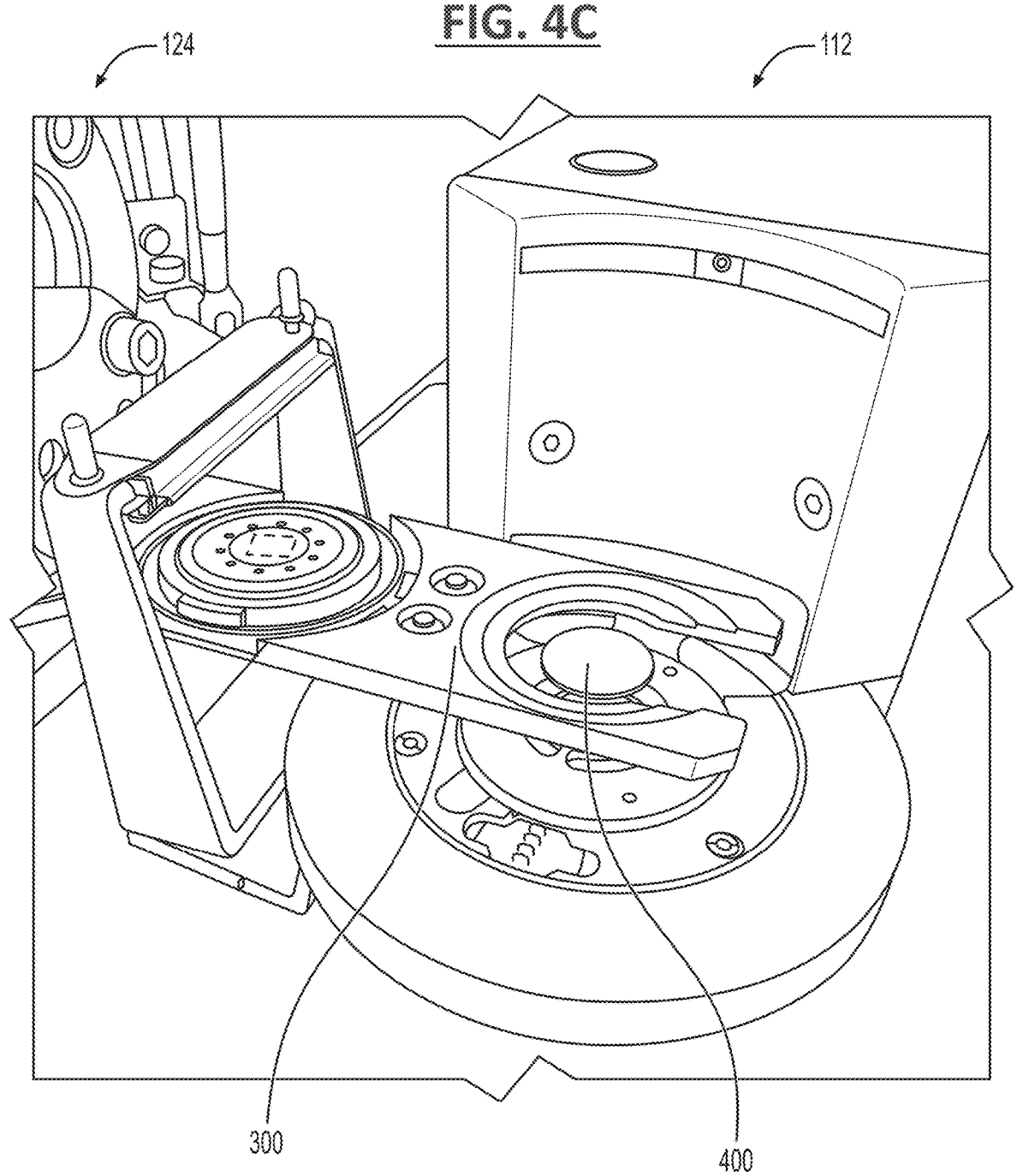

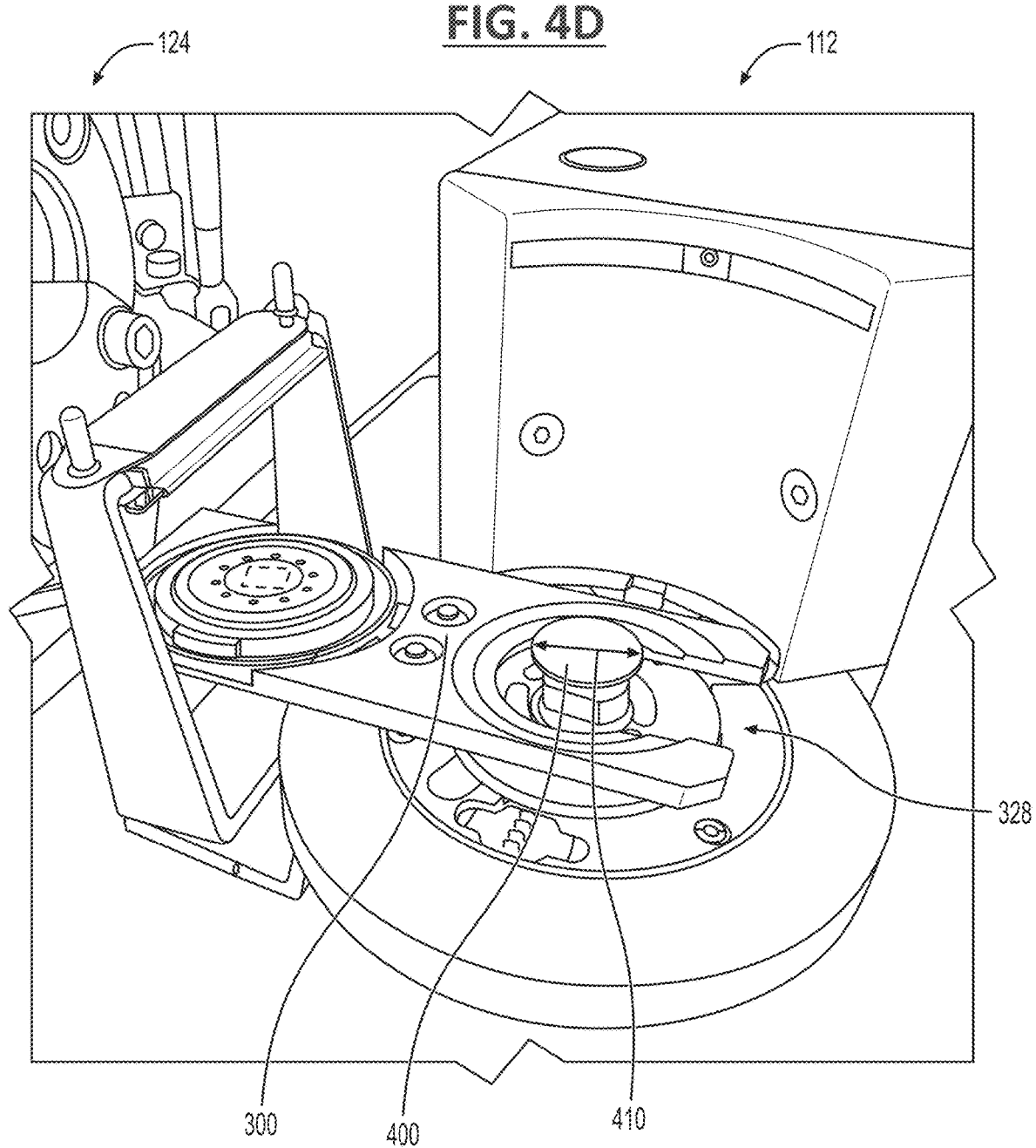

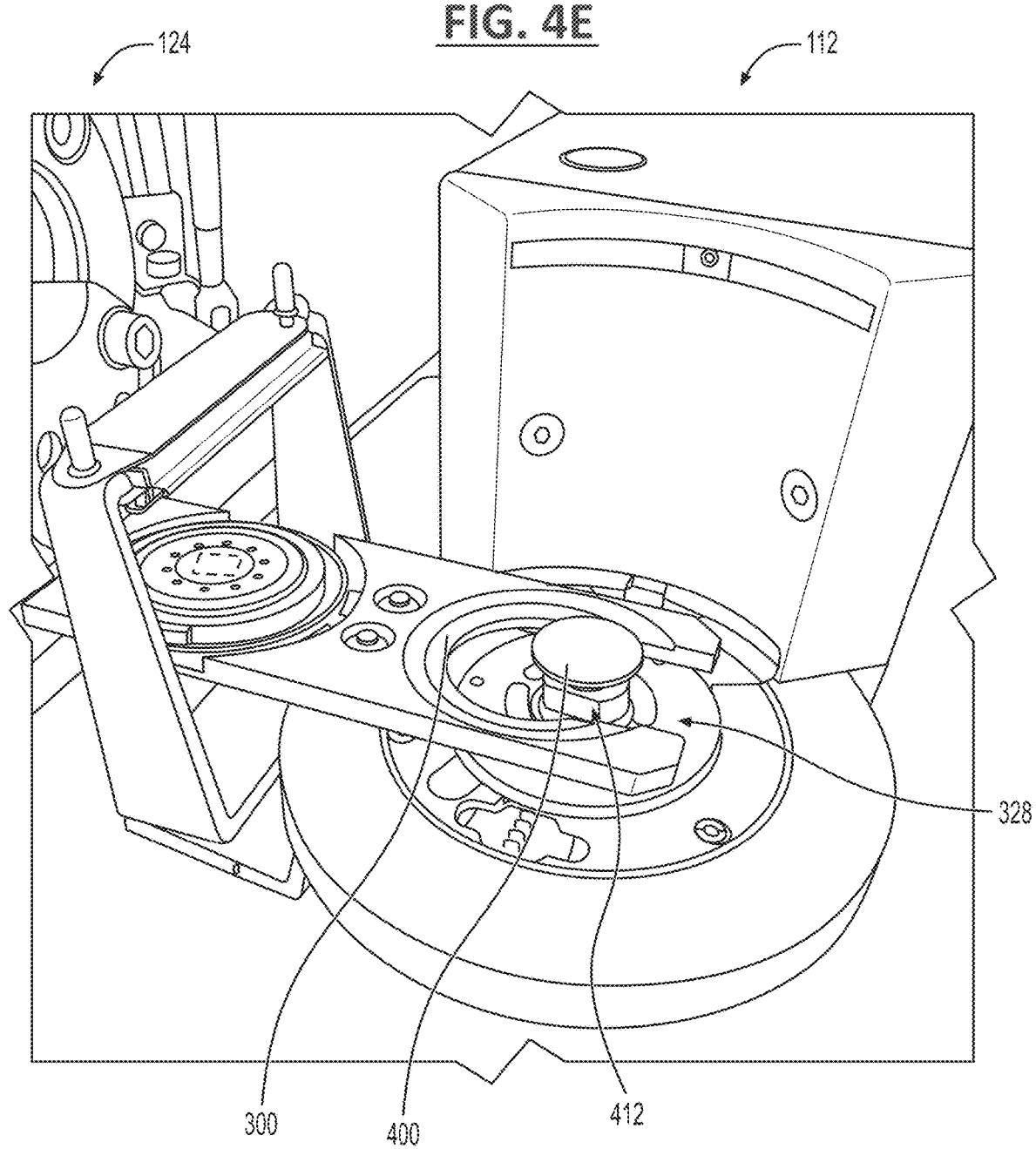

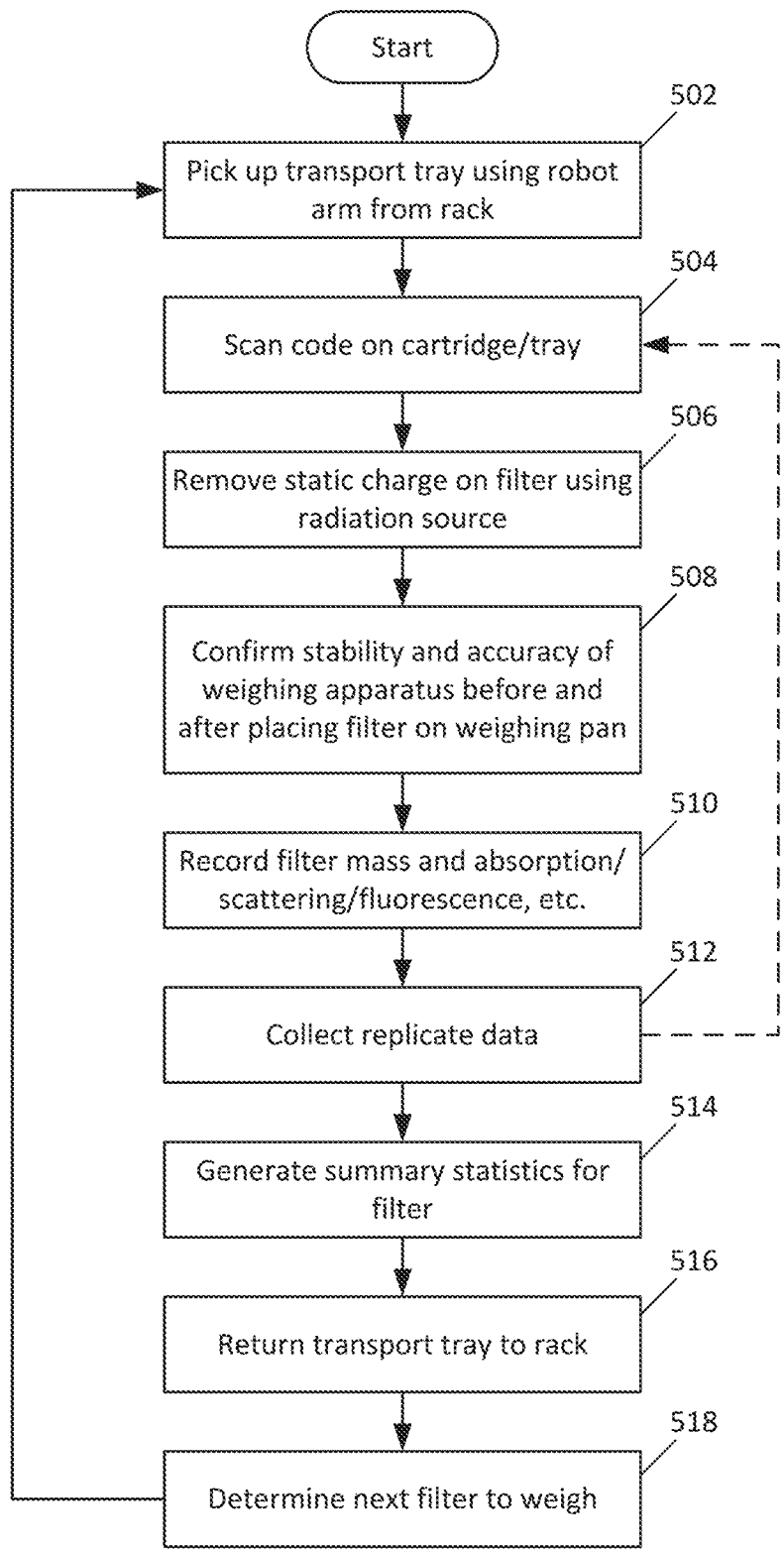

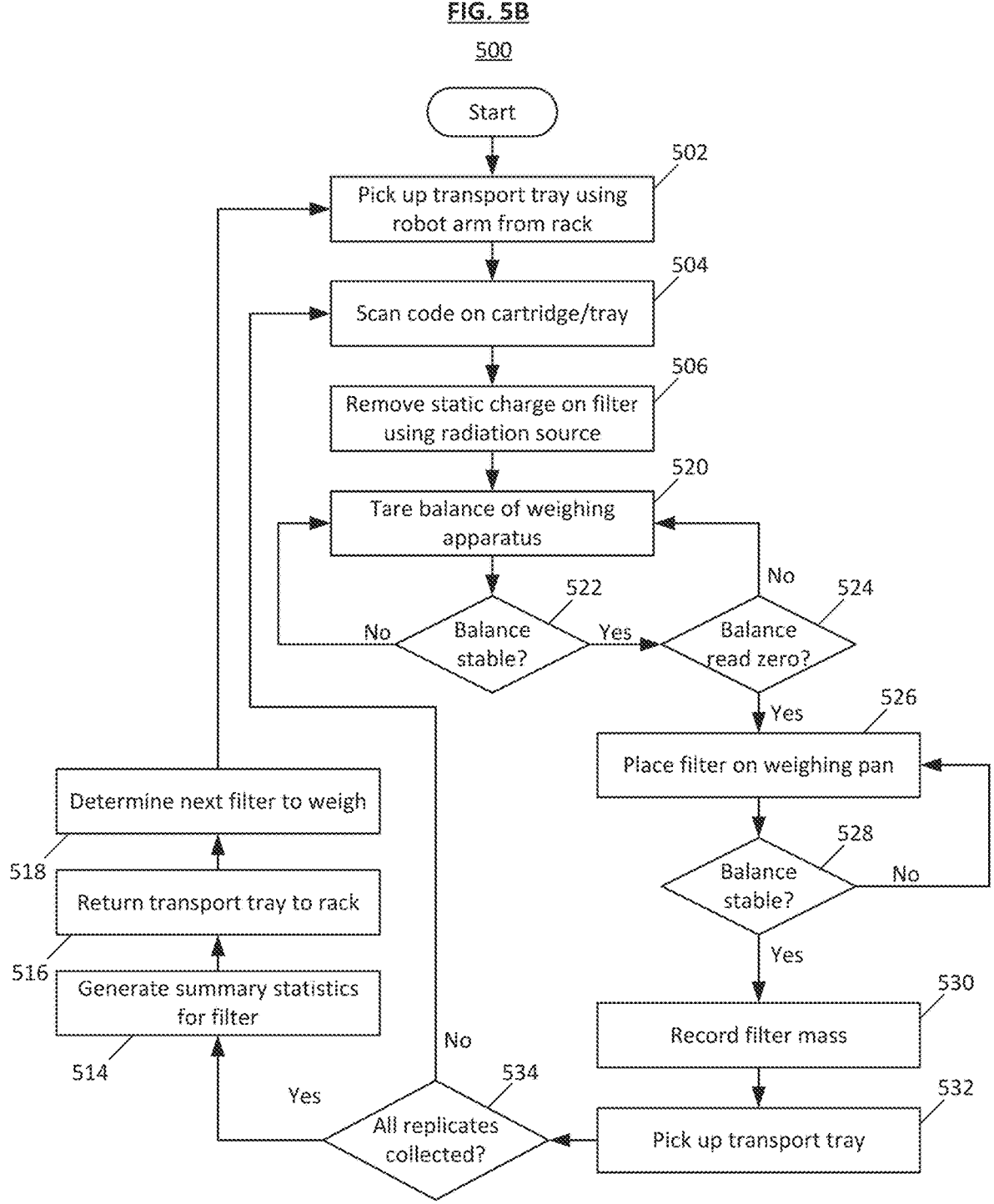

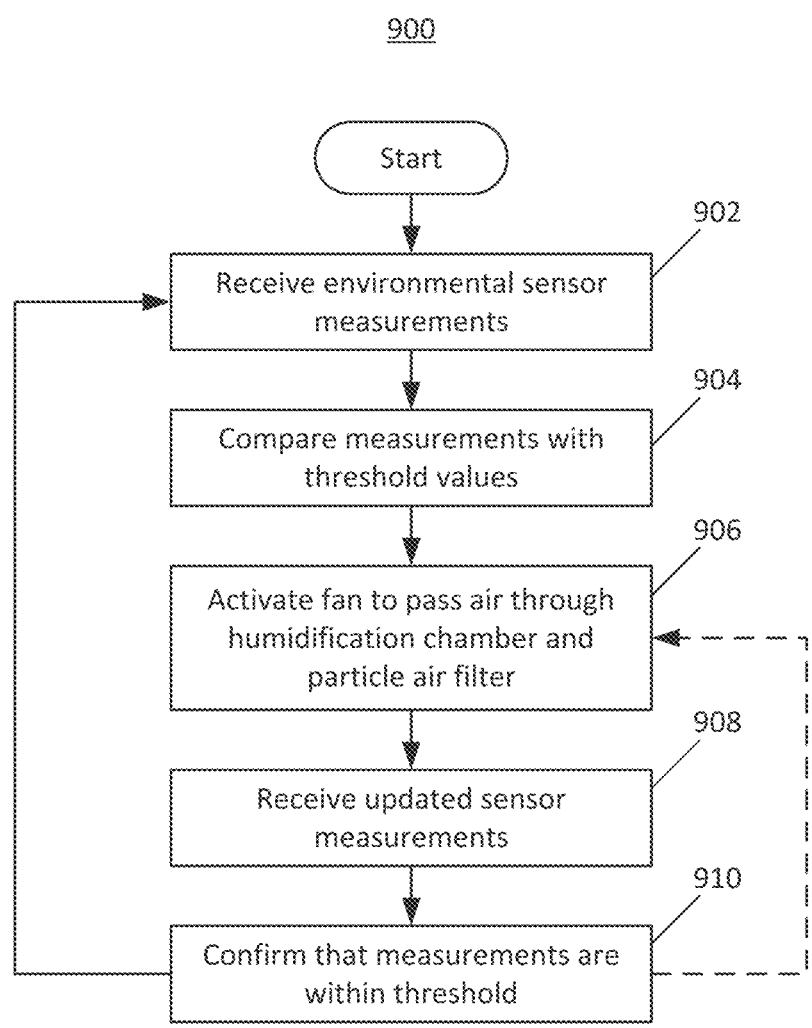

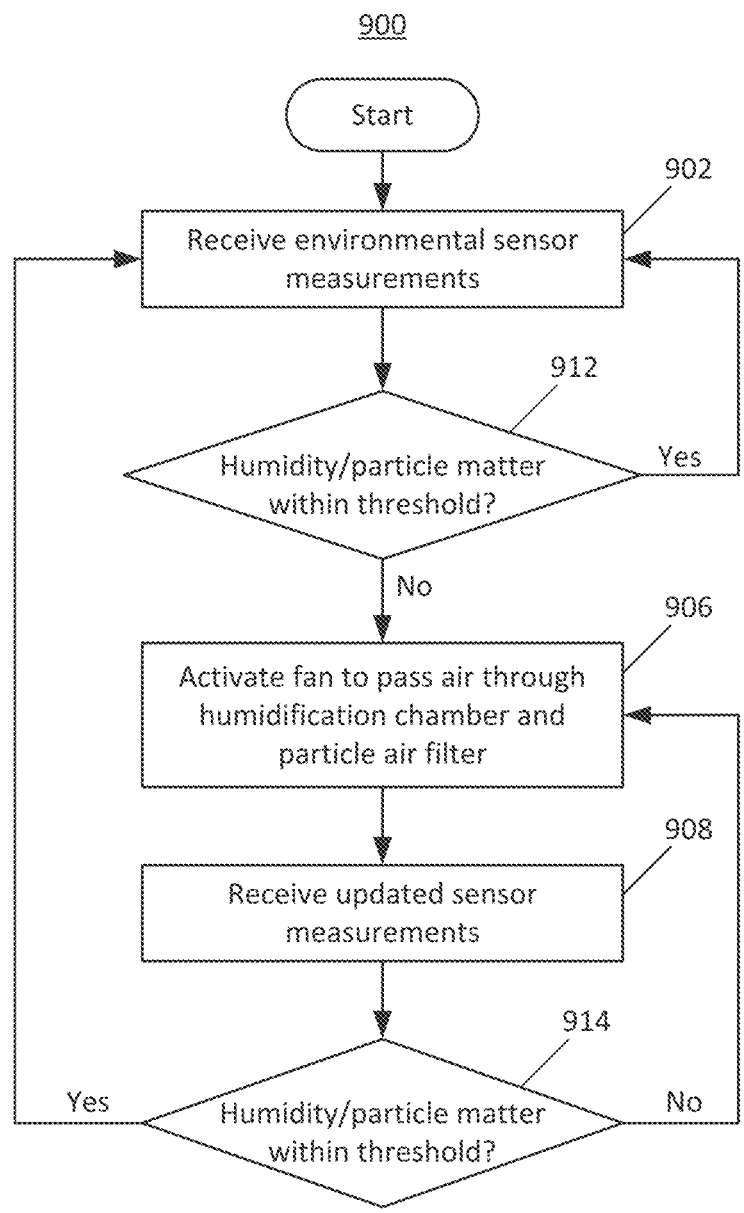

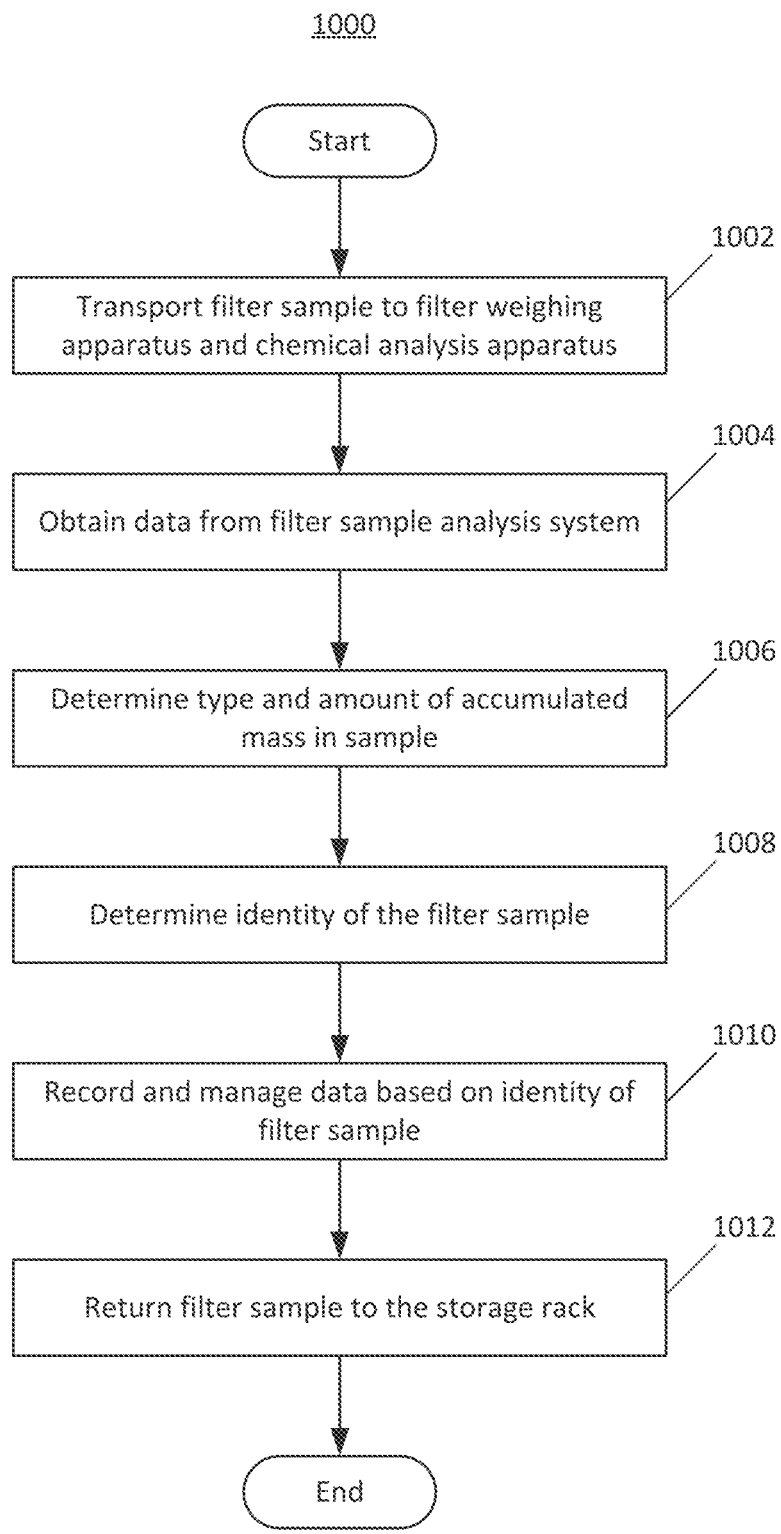

METHODS AND SYSTEMS FOR AUTOMATED ANALYSIS OF AEROSOL SAMPLING FILTERS

CROSS-REFERENCE TO RELATED APPLICATION

This application claims priority to U.S. Provisional Application No. 63/148,952, filed on Feb. 12, 2021, incorporated herein by reference in its entirety.

GOVERNMENT LICENSE RIGHTS

This invention was made with government support under grant K01 OH011598 and R01 OH011660 awarded by Centers for Disease Control, and grant 80NSSC18M0120 awarded by the National Aeronautics and Space Administration. The government has certain rights in the invention.

FIELD OF THE DISCLOSURE

The devices and methods described herein generally relate to the automated robotic analysis of samples, in particular samples of aerosol filters.

BACKGROUND

Exposure to airborne particulate matter (PM) is the leading environmental risk factor for premature disease and death on the planet. The gold-standard method for determination of PM mass concentrations is gravimetric analysis of air sampling filters. The United States Environmental Protection Agency (US EPA) describes gravimetric analysis as the sole Federal Reference Method for the determination of PM2.5 and PM10 concentrations (particles with aerodynamic diameters≤2.5 µm and 10 µm, respectively) in air; this method is then used to establish equivalence for all other methods (e.g., light-scattering, beta-attenuation). Unfortunately, gravimetric filter analysis is tedious and prone to bias or imprecision unless strict quality control procedures are employed.

Gravimetric analysis requires quantifying the mass of PM accumulated on an air sampling filter, for example by weighing the filter on an analytic microbalance before and after a timed air sample is collected at a pre-determined flow rate. Precise measurements are needed because the differential mass (of accumulated PM) is often small compared to the total filter mass. Static electricity and slight variations in environmental conditions can bias the measurement. Regulatory agencies such as the United States EPA, among others, have established requirements for gravimetric analysis. Slight differences in procedures and guidelines exist between different regulatory agencies; however, many published procedures include similar approaches and performance limits, such as control of ambient temperature and humidity, electrostatic discharge of the filter prior to weighing, and rules for filter handling and equilibration.

The challenge of making precise and unbiased gravimetric filter measurements is compounded by the tedious, labor-intensive nature of the measurement. Human errors are common and include failure to maintain steady and appropriate environmental conditions, failure to wait until the balance has stabilized before recording a reading, and transcription mistakes when manually recording readings. The repetitive nature of filter weighing is monotonous; thus, the likelihood of human error increases with sample size as individuals tend to rush the weighing process or become negligent to proper filter handling procedures. The weighing of filters is also time-intensive. Each replicate measurement of a gravimetric filter can take several minutes. A trained technician in a laboratory, following the EPA protocol, can manually weigh between 10-15 filters per hour.

Robotic, automated gravimetric analysis systems can decrease human error and reduce personnel burden while increasing analysis throughput. Robotic systems can also achieve the environmental conditions and precision required to comply with United States EPA gravimetric analysis protocols. Several automated weighing systems are commercially available; however, these systems are difficult to customize, have limited options for integrating additional measurements, and are often cost-prohibitive. As such, there is a need for a cost-effective, high-throughput, automated filter analysis system that is compliant with United States EPA gravimetric filter analysis requirements and configurable to include additional filter analysis techniques.

SUMMARY

Examples disclosed herein include an automated air quality analysis system. The system includes: a sealed enclosure, a filter sample analysis system disposed within the sealed enclosure, and a controller operably coupled with the filter sample analysis system. The filter sample analysis system includes: an automated filter management system including a filter storage rack comprising a plurality of filter samples and an articulating robotic arm configured to select one of the filter samples for analysis, a filter weighing apparatus configured to determine a weight of the selected filter sample, and a primary chemical analysis apparatus configured to perform electromagnetic energy spectroscopy measurement on the selected filter sample. The controller operates the automated filter management system to transport the selected filter sample to the filter weighing apparatus and the primary chemical analysis apparatus, obtains data from the filter sample analysis system, and determines type and amount of accumulated mass in the selected sample based on the weight and a result of the electromagnetic energy spectroscopy measurement.

In some examples, the robotic arm is configured to transport the selected filter sample from the filter storage rack to at least one of the filter weighing apparatus and the primary chemical analysis apparatus and subsequently return the selected filter sample to the filter storage rack. In some examples, the primary chemical analysis apparatus is configured to perform optical absorption spectroscopy measurement on the selected filter sample, and the filter sample analysis system further comprises a secondary chemical analysis apparatus configured to perform atomic emission spectroscopy measurement on the selected filter sample.

In some examples, the filter sample analysis system further comprises a tertiary chemical analysis apparatus configured to perform atomic absorption spectroscopy measurement on the selected filter sample. In some examples, the robotic arm is configured to transport the selected filter sample to the secondary and tertiary chemical analysis apparatuses before returning the selected filter sample to the filter storage rack.

In some examples, the controller is configured to determine the type of the accumulated mass in the selected sample based on results of the optical emission spectroscopy measurement, the atomic emission spectroscopy measurement, and the atomic absorption spectroscopy measurement. In some examples, the primary, secondary, and tertiary chemical analysis apparatuses are located in different sections within the sealed enclosure within reach of the robotic arm.

In some examples, the selected filter sample is transported via a transport tray comprising a slot in which the selected filter sample is disposed for transport and a cartridge holder configured to hold a sampling cartridge associated with the selected filter sample for identification. In some examples, the sampling cartridge includes an identification code for uniquely identifying and tracking the selected filter sample from among the plurality of filter samples. In some examples, the filter sample analysis system further comprises a scanner configured to scan the identification code, and the controller is configured to determine an identity of the selected filter sample based on the scanned identification code and associate the determined type and amount of the accumulated mass with the identity of the selected sample. In some examples, the filter sample analysis system further comprises a camera configured to record image data of the selected filter sample for at least one of: sample traceability, quality assurance, or damage detection. In some examples, the controller is configured to record and manage the data obtained from the filter sample analysis system in a memory unit based on the scanned identification code.

In some examples, a diameter of the selected filter sample is greater than a diameter of the slot. In some examples, the filter weighing apparatus comprises a weighing pan onto which the selected filter sample is positioned, and the diameter of the slot is greater than a diameter of the weighing pan. In some examples, the weighing pan is detachable and selectable from a plurality of weighing pans with different diameters to accommodate the diameter of the selected filter sample. In some examples, the filter weighing apparatus further comprises a radiation source configured to remove static charge from the selected filter sample before positioned on the weighing pan. In some examples, the filter weighing apparatus further comprises a draft shield configured to facilitate reducing an effect of air currents within the sealed enclosure on the determined weight of the selected filter sample.

In some examples, the automated air quality analysis system further includes an environmental control system disposed within the sealed enclosure and comprising a fan, a humidifier/dehumidifier, and a particle filter, wherein the controller is operably coupled with the environmental control system to control humidity and reduce free-floating particles within the sealed enclosure. In some examples, the humidifier/dehumidifier includes a chamber storing therein a saturated salt solution which maintains a predetermined level of humidity within the chamber. In some examples, the environmental control system further includes a temperature regulation device to control a temperature within the sealed enclosure.

In some examples, the automated air quality analysis system further includes a data network operatively coupled with at least one of the controller or the filter sample analysis system for wired or wireless data communication. In some examples, the robotic arm is a six-axis articulating robotic arm. In some examples, the robotic arm includes a plurality of distally extending holders via which the selected filter sample is transported. In some examples, the holders are magnetically attached to a head portion of the robotic arm.

Also disclosed herein are methods of operating a filter sample analysis system. The method includes: selecting, by a controller, a filter sample to analyze; operating, by the controller, an automated filter management system to transport the selected filter sample to a filter weighing apparatus and a primary chemical analysis apparatus; determining, by the filter weighing apparatus, a weight of the selected filter sample; performing, by the primary chemical analysis apparatus, electromagnetic energy spectroscopy measurement; and determining, by the controller, type and amount of accumulated mass in the selected sample based on the weight and a result of the electromagnetic energy spectroscopy measurement.

In some examples, the method further includes: transporting, by a robotic arm of the automated filter management system, the selected filter sample from a filter storage rack to at least one of the filter weighing apparatus and the primary chemical analysis apparatus; and returning, by the robotic arm, the selected filter sample to the filter storage rack. In some examples, the method further includes: performing, by the primary chemical analysis apparatus, optical absorption spectroscopy measurement on the selected filter sample; and performing, by a secondary chemical analysis apparatus, atomic emission spectroscopy measurement on the selected filter sample.

In some examples, the method further includes: performing, by a tertiary chemical analysis apparatus, atomic absorption spectroscopy measurement on the selected filter sample. In some examples, the method further includes: transporting, by the robotic arm, the selected filter sample to the secondary and tertiary chemical analysis apparatuses before returning the selected filter sample to the filter storage rack. In some examples, the method further includes: determining, by the controller, the type of the accumulated mass in the selected sample based on results of the optical emission spectroscopy measurement, the atomic emission spectroscopy measurement, and the atomic absorption spectroscopy measurement.

Also disclosed herein is a non-transitory computer-readable storage medium storing thereon instructions which, when executed by a processor, causes the processor to perform any of the methods of operating the filter sample analysis system as previously disclosed.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 3C is a top view of a sampling cartridge according to embodiments disclosed herein.

FIG. 3D is a cross-sectional side view of a transport tray with a filter disposed thereon according to embodiments disclosed herein.

FIG. 3E is a top view of a plurality of transport trays of different types according to embodiments disclosed herein.

FIGS. 4A-4E are images of a weighing apparatus of the automated analysis system of FIG. 1A to illustrate the movement of the weighing apparatus according to embodiments disclosed herein.

FIGS. 5A and 5B are flowcharts for embodiments of a method of controlling the robotic arm and the weighing apparatus of the automated filter management system of FIG. 3A as disclosed herein.

FIGS. 9A and 9B are flowcharts for embodiments of a method of controlling the environmental control system of FIG. 8 as disclosed herein.

FIG. 10 is a flowchart for embodiments of a method of performing automatic filter sample analysis as disclosed herein.

It should be understood that the drawings and replicas of the photographs are not necessarily to scale. In certain instances, details that are not necessary for an understanding of the disclosure or that render other details difficult to perceive may have been omitted. It should be understood, of course, that the disclosure is not necessarily limited to the particular examples or embodiments illustrated or depicted herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
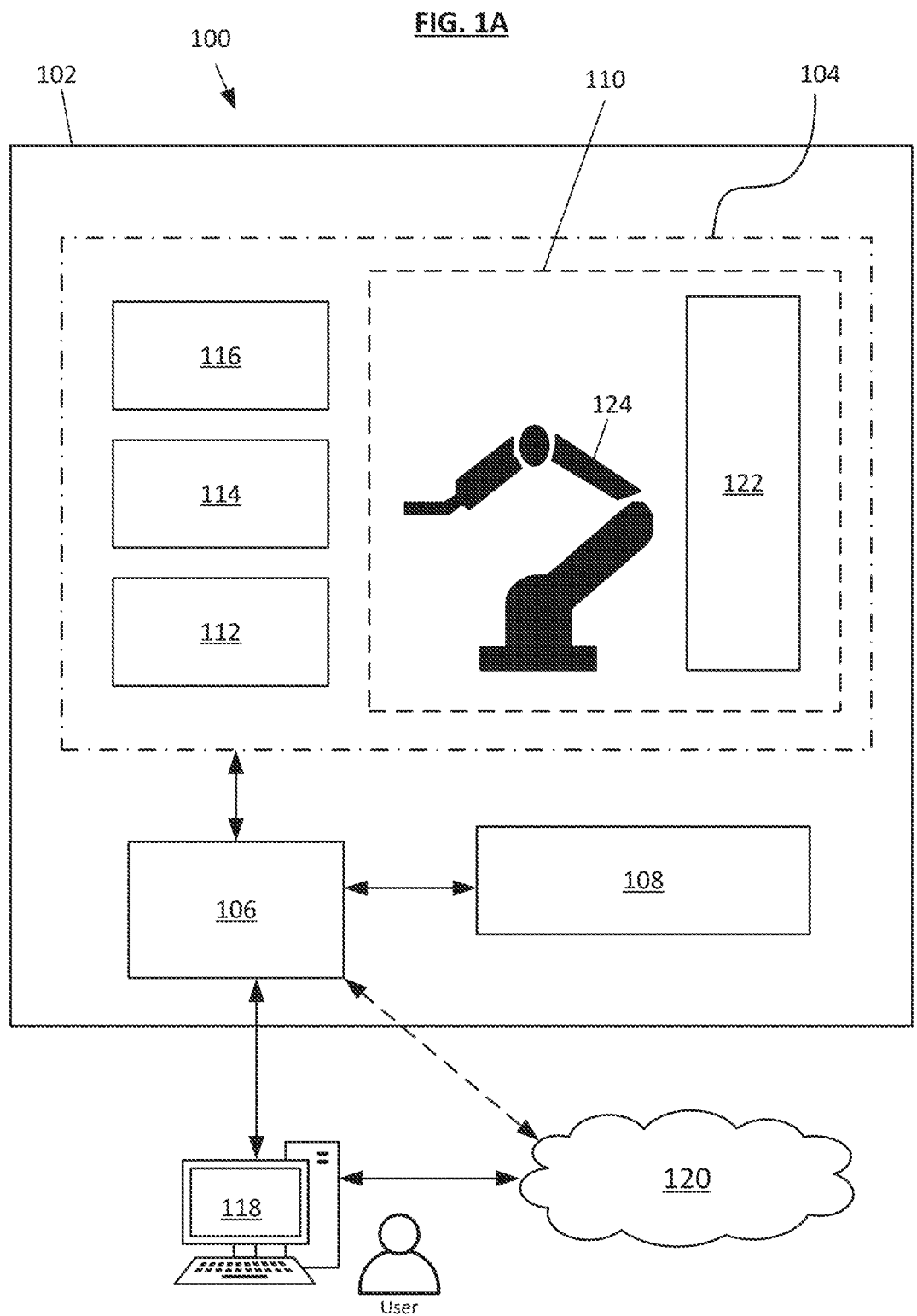
FIG. 1A is block diagram of an automated analysis system according to embodiments disclosed herein.

Referring to FIG. 1A, an automated analysis system 100 for air quality filter samples is shown. The automated analysis system 100 includes (a) an enclosure 102, a filter sample analysis system 104, (b) a data acquisition/control system 106, and (g) an environmental control system 108. The filter sample analysis system 104 includes (c) an automated filter management system 110, (d) a weighing apparatus 112, (e) a chemical analysis apparatus 114, and (f) a sample tracking system 116.

In some examples, the system 100 also includes an external computer 118 with user interface such as a display or monitor for a user to interact, and/or an external data network 120 such as any suitable data communications network, including but not limited to Internet, Intranet, cloud network, etc., to transmit data between different apparatuses and systems as disclosed herein. In some examples, the external computer 118, which is located external to the enclosure 102, is operatively coupled with the control system 106 via wired communication or wireless communication, as suitable. In some examples, the computer 118 (which may alternatively be any suitable computing device such as smartphones or tablet computer, etc.) is operatively coupled with the network 120 to share data from the control system 106 with other remotely connected devices. In some examples, the control system 106 is directly communicable with the network 120 so as to provide such data to other devices.

The automated filter management system 110 includes a filter storage rack 122 which stores a plurality of different filter samples as well as a robotic arm 124 which transports the filter samples from the rack 122 to different apparatuses and systems (a) through (g) as disclosed herein, each of which may also be referred to as a subsystem.

Figure 1B:
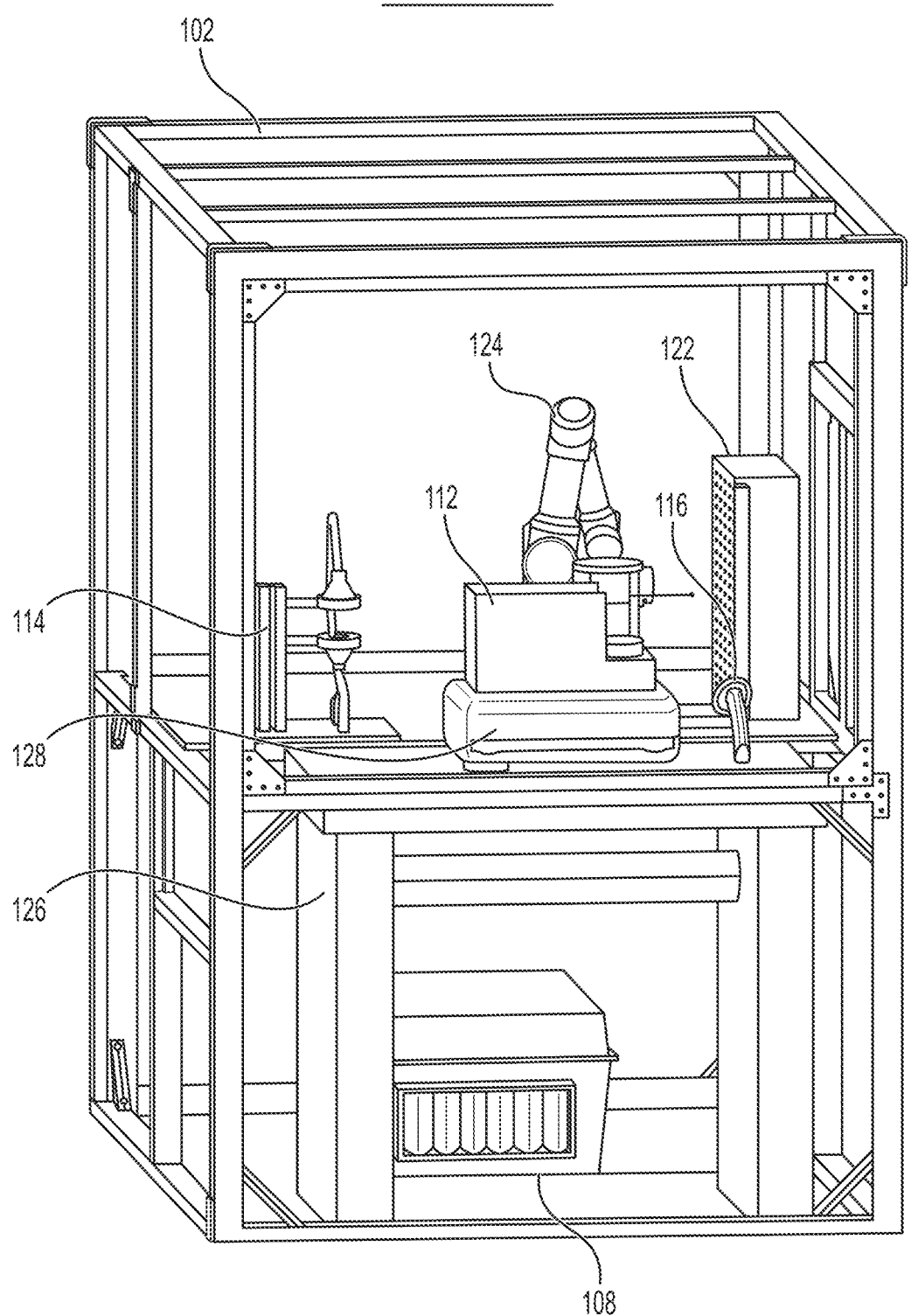
FIG. 1B is an angled side view of the automated analysis system of FIG. 1A according to embodiments disclosed herein.
Figure 1C:
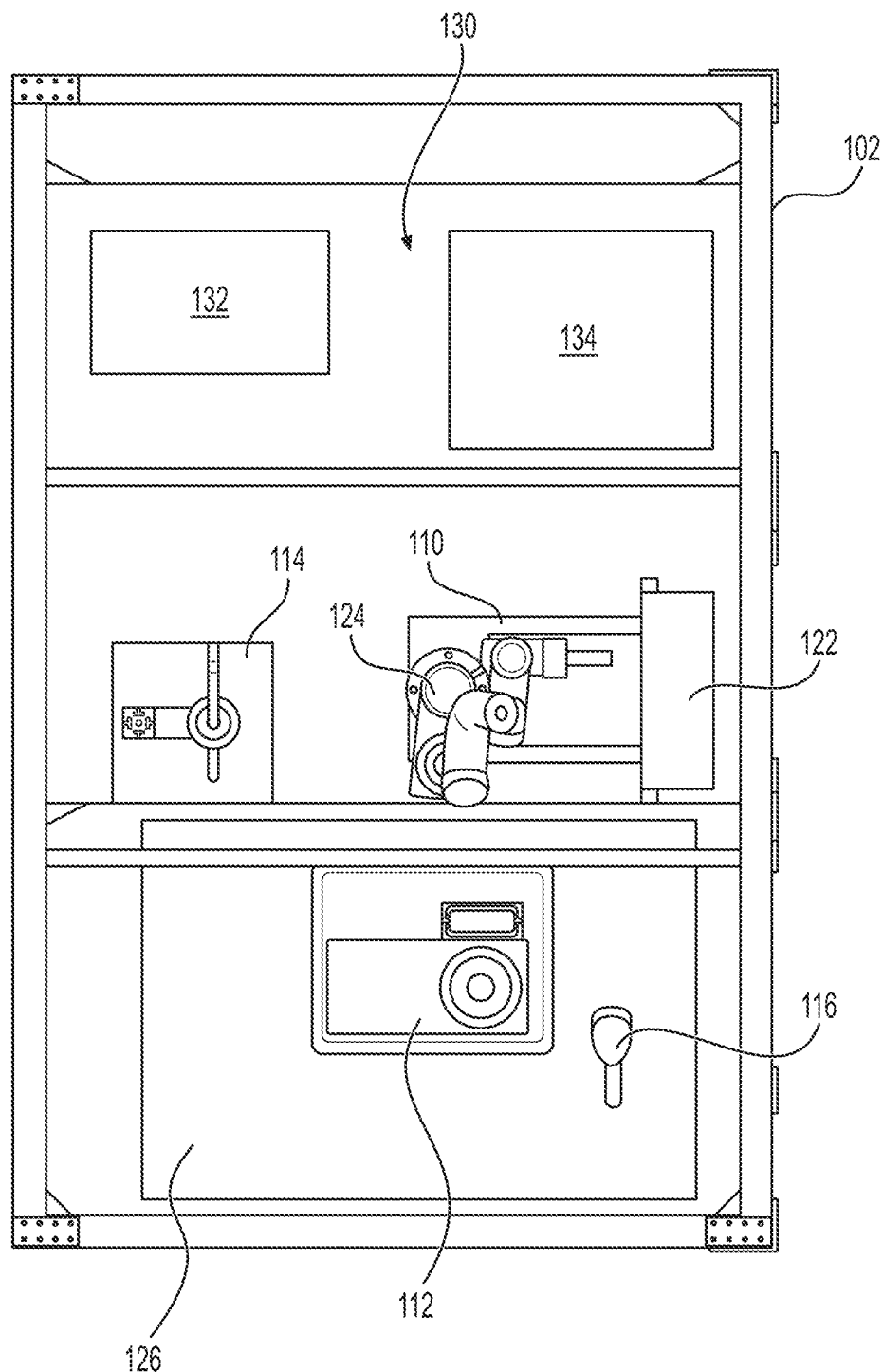
FIG. 1C is a top view of the automated analysis system of FIG. 1B according to embodiments disclosed herein.

Referring to FIGS. 1B and 1C, the enclosure 102 further includes a table 126 and a base 128 onto which the weighing apparatus 112 may be positioned, as well as an additional space 130 that is not occupied by any of the aforementioned system. In some examples, the base 128 may be made of any suitable material for stabilizing the weighing apparatus 112 including but not limited to an epoxy block. In some examples, as shown, the additional space 130 may house one or more additional subsystems such as an X-ray system 132 or an additional spectroscopy apparatus 134, among others. All of these subsystem are within reach of the robotic arm 124 such that the robotic arm is capable of transporting the filter sample between any of these subsystems.

(a) Sealed Enclosure

The sealed enclosure 102 allows for control of ambient humidity, filtration of air within the enclosure, as well as reduction of vibration and indoor air currents which may affect measurement precision. The enclosure may be any suitable dimension to house the aforementioned subsystems and may be constructed from any suitable material. For example, the material may be extruded t-frame aluminum with acrylic wall panels installed therein. In some examples, the enclosure has one or more doors and/or windows or removable panels for accessing via sealing rubber gaskets for sample loading and unloading as well as system maintenance. In some examples, each side of the enclosure may have a dimensional length of between about 1 meter (m) and 1.5 m, 1.5 m and 2 m, 2 m and 2.5 m, 2.5 m and 3 m, or greater, for example, to accommodate the different types and number of subsystems enclosed therein.

In some examples, the enclosure has more spacing within than is sufficient for simply weighing the filters. For example, the increased volume within the enclosure may support additional space to equilibrate the filters before weighing and may facilitate expansion to include other non-destructive filter analysis apparatuses. In some examples, proper measurement practices require that filters equilibrate to the same temperature and relative humidity as the balance or weighing apparatus 112 for at least twenty-four (24) hours before weighing the sample. Because the enclosure can accommodate any suitable number of unused filters (for example, hundreds or thousands of such unused filters), new and fully-equilibrated filters may be ready to be weighed and placed into service as needed at any suitable time. The volume of the enclosure may also diminish internal temperature and humidity fluctuations that may occur when doors are opened to load or unload filter samples, for example.

(b) Data Acquisition and Control System

Figure 2:
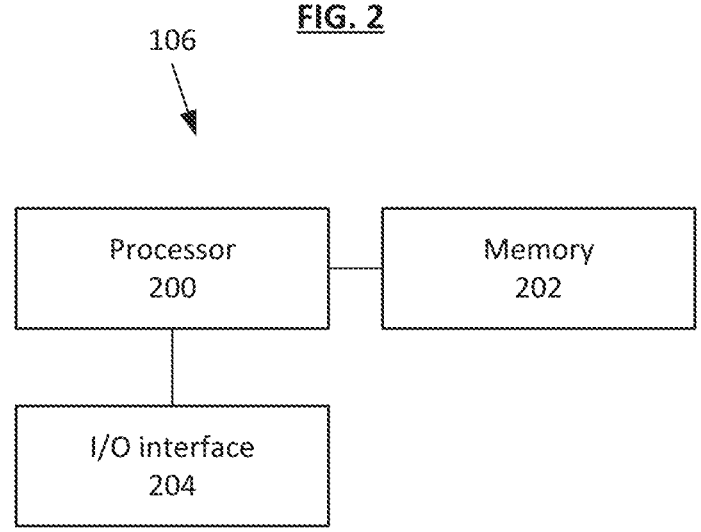
FIG. 2 is a block diagram of a data acquisition/control system of the automated analysis system of FIG. 1A according to embodiments disclosed herein.
Figure 3A:
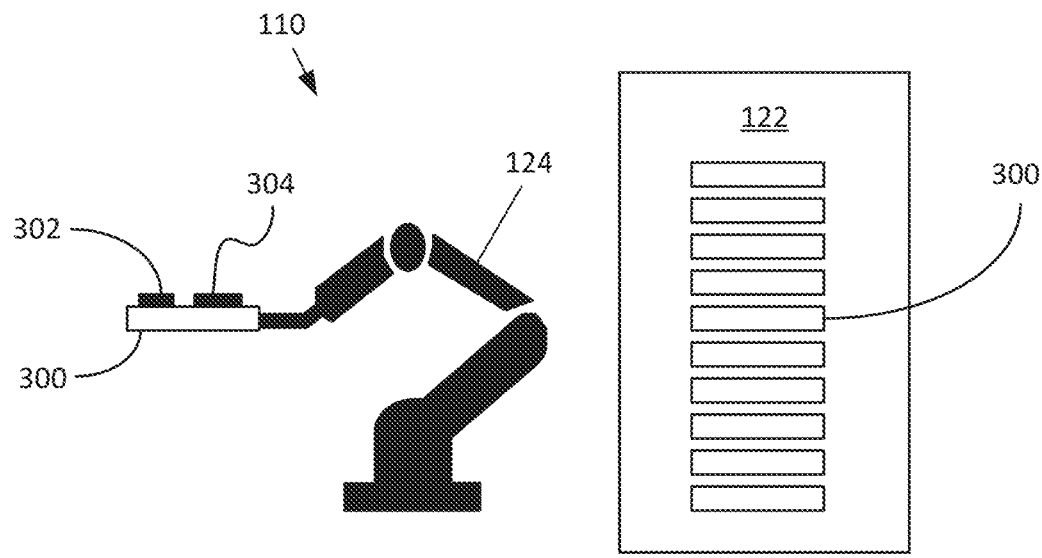
FIG. 3A is a block diagram of an automated filter management system of the automated analysis system of FIG. 1A according to embodiments disclosed herein.
Figure 3B:
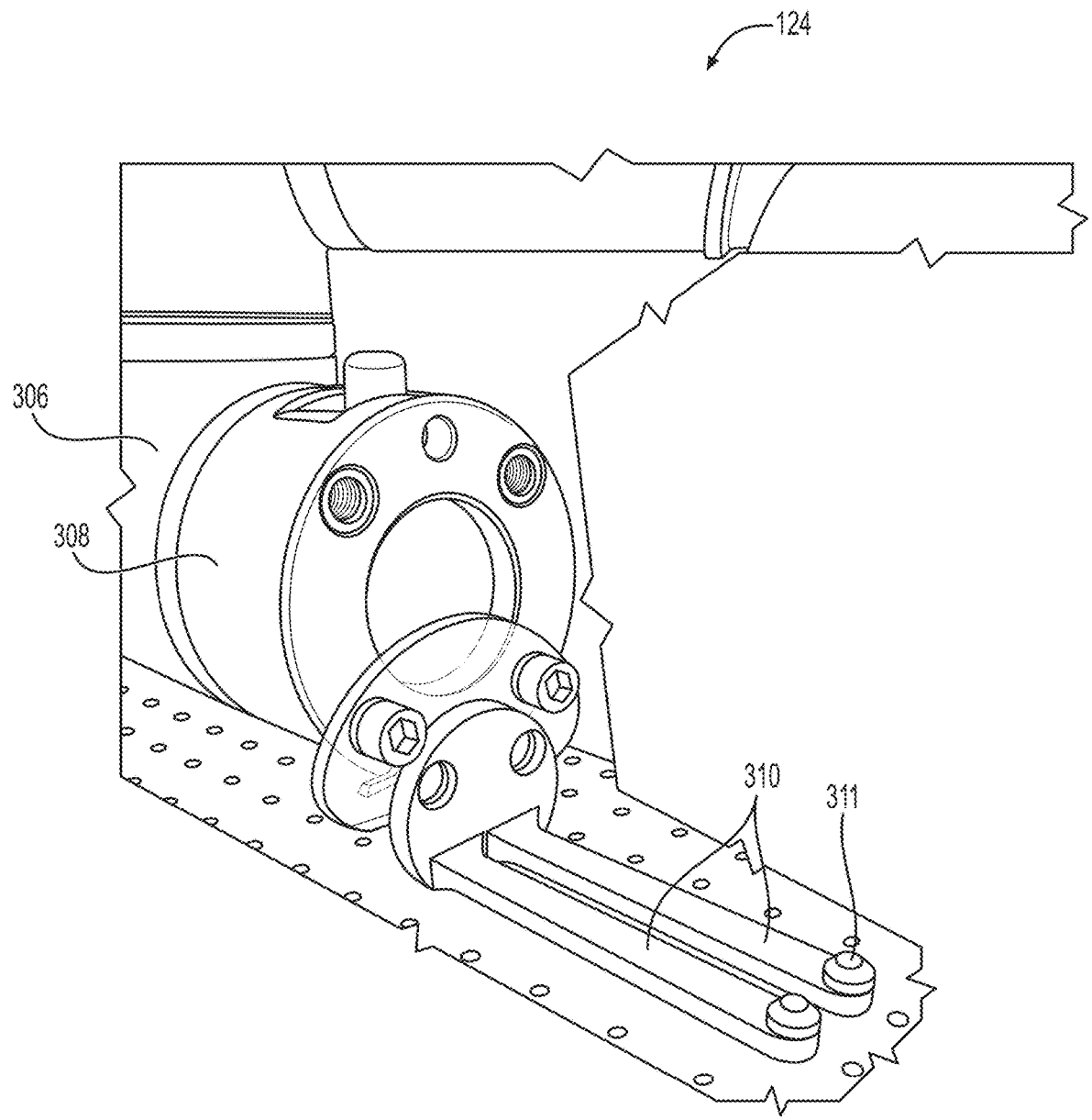
FIG. 3B is a close-up view of horizontal rails or forklift arms of the automated filter management system of FIG. 3A according to embodiments disclosed herein.

Referring to FIG. 2, the control system 106 may include any suitable structure, such as a processor device including but not limited to a CPU, or a state machine including but not limited to a programmable logic controller, among others. In the example of a processor device, the control system 106 may include at least one processor 200 operatively coupled with a memory unit 202 such as a non-transitory computer-readable storage medium storing thereon instructions which, when executed by the processor 200, causes the processor 200 to perform the methods of operating the filter sample analysis system as further disclosed herein. The memory unit 202 may be a flash drive, DRAM, SRAM, ROM, or any other suitable type of memory unit known in the art. The control system 106 may also include an input/output interface 204 to transmit/receive data between the other subsystems as further disclosed herein.

In some examples, the control system 106 controls the filter sample analysis system 104 and the environmental control system 108 separately and simultaneously (e.g., in two processes operating parallel with each other), such that the measurements taken by the filter sample analysis system are not affected by fluctuating environmental conditions such as humidity and temperature, for example, by controlling the environmental control system 108 appropriately to be within the required or desired ranges. In some examples, the data collected may be logged on a system memory (such as memory unit 202), and in some examples also backed up to a remote server or computer (such as the external computer 118) for redundancy and data integrity. Some of the methods used by the control system 106 are shown in FIGS. 5A, 5B, 9A, 9B, and 10.

Automated weighing system as disclosed herein are beneficial in reducing or eliminating many of the human errors associated with manual weighing. However, because the system also eliminates human review (i.e., manual review by human personnel) of each individual data point, redundancy and/or summary statistics may be generated for each filter to reduce or eliminate the risk of error or quality control issues caused by the lack of manual review by human personnel. For example, summary statistics may be generated for each filter such that the statistics include at least one measurement range (difference between the maximum weight and minimum weight) and standard deviation, for example. The summary statistics facilitate determining, by a human operator, if additional measurements should be collected before releasing the pre-weighed filters for use or post-weighed filter data for analysis, for example. Quality control metrics such as environmental conditions, background PM levels, and reference weight measurements may also be recorded and presented through a graphical user interface in real-time, for example via a display or screen of the external computer 118.

(c) Robotic Filter Handling and Storage

Referring to FIGS. 3A through 3E, the automated filter management system 110 includes the filter storage rack 122 which stores a plurality of transport trays 300. The rack 122 and transport trays 300 may be custom-designed (for example, via 3D-printing) to suit the size of each filter samples and/or the number of filter samples to be analyzed. Each transport tray 300 holds a filter sample 302 and a sampling cartridge 304 associated with the filter sample, in some examples. The sampling cartridge 304 includes the same content as the filter sample 302 and includes on its outer surface a scannable identifier code 312 such as a barcode or QR code to identify what the sample is in the database or computer system. In some examples, the code 312 to identify the filter sample 302 may be printed or pasted on the cartridge 304. Alternatively, the code 312 to identify the filter sample 302 may be printed or pasted directly on the transport tray 300 which holds the filter sample 302. The robotic arm 124, which may be a six-axis robotic arm, takes each determined transport tray out from the rack 122 to transport it through any predetermined number of other subsystems for measurement and analysis, then returns the transport tray into the corresponding spot on the rack 122.

The transport tray 300 has a cartridge holder 322 which may be a depression on a surface of the transport tray in which the sampling cartridge 304 can be positioned. The sampling cartridge 304 corresponds to the filter sample 302 that is placed at a slot 318 of the transport tray 300 that is formed between two arms 320 (shown as arms 320A and 320B in FIGS. 3D and 3E). The slot 318 has a diameter 316 (that is, the maximum diameter measured in the slot 318 or, in some examples, in a circular opening 330 of the slot as measured between the two arms 320A and 320B) which is less than a diameter 314 of the filter sample 302 (that is, the maximum diameter measured from one end to another of the filter sample's outer periphery) to prevent the filter sample from slipping through the slot while being transported. There may be different types of transport trays 300 for different sizes of filter samples 302 and sampling cartridges 304, such that the size of the cartridge holder 322 and the diameter 316 of the slot 318 may vary from one type to another, in order to accommodate the different diameters 314 of the filter samples 302 provided.

In some examples, the filter sample 302 rests on a ledge 324 formed by the inner portion of the slot 318 or the circular opening 330 thereof. The ledge 324 may extend approximately 60%, 70%, 80%, 90%, or any other value therebetween, with respect to the periphery of the filter sample 302, leaving the bottom and one side of the filter sample exposed. In some examples, the different diameters of the filter samples 302 may include: 25 mm, 37 mm, and 47 mm, although any other suitable diameters may be employed. In some examples, the slot 318 may have two sections: a substantially parallel opening 328 and a substantially circular opening 330 such that the parallel opening leads to the circular opening. In some examples, the parallel opening 328 has an opening width 332 defined as a distance between the inner sides of the arms 320A and 320B, and the opening width 332 may be smaller than the diameter 316 of the circular opening 330. As illustrative examples, when the opening width 332 is slightly smaller than the diameter 316, the slot 318 may resemble the shape of an "arch," and when the opening width 332 is substantially smaller than the diameter 316, the slot 318 may resemble the shape of a "keyhole."

As shown, each tray 300 is placed in the storage rack 122 to await pickup by the robotic arm 124. The storage rack 122 includes a series of slots which may be configured in a row, a column, a two-dimensional rectangular grid, or any other suitable arrangement. In some examples, the rack 122 may be able to hold up to about 100 filters, 200 filters, 500 filters, 1000 filters, or more, so long as the rack 122 is capable of fitting inside the enclosure 102 and all the filters are within the reach of the robotic arm.

The transportation is facilitated by a set of holders 310 on the robotic arm 124 which extends in any suitable direction such that the transport tray can stably rest on the holders during transport. For example, the holders 310 may be a pair of longitudinally extending members, similar to a forklift, where the members may or may not be parallel with each other. There may also be an upward pointing section 311 at the distal end of the members to facilitate reducing the likelihood of the transport tray slipping or falling off from the holders by inserting the upward pointing sections 311 into openings 326 formed on the transport tray 300. These holders allow the robotic arm to pick up and move each of the transport trays 300. The holders 310 may be attached to a head portion 306 of the robotic arm 124 via a magnetic attachment 308 (such as via neodymium magnets, for example) to enable the holders to break away or detach from the robotic arm in the event of the robotic arm encountering resistance or is out of alignment, as part of the safety measure for the robotic arm. Other types of suitable temporary attachment means such as Velcro, clips, etc. may also be employed in place of the magnetic attachment.

(d) Weighing Apparatus

Referring to FIGS. 4A through 4E, a weighing apparatus 112 works in conjunction with the robotic arm 124 to facilitate automation of the weighing process. Specifically, the weighing apparatus 112, which includes a weighing pan 400 with a periphery 402 that is smaller than the diameter 316 of the slot 318 of the transport tray 300, a draft shield 404 to facilitate reducing an effect of air currents within the sealed enclosure 102 on the determined weight of the filter sample 302 that is weighed, and a radiation source 406 (including but not limited to polonium-210 radiation source) that is held facing toward the filter sample as it passes by, in order to remove static charge from the filter sample before being positioned on the weighing pan. To facilitate the static charge removal, the robotic arm 124 may hold the filter sample 302 to within any suitable predetermined distance (for example, about 10 mm) of the radiation source 406 for any suitable predetermined period of time (for example, about 30 seconds) prior to weighing. In some examples, the weighing pan 400 is detachable and replaceable, with a plurality of different sizes and/or shapes to accommodate (and are fine-tuned) for the different size and/or shape of the filter samples 302 that are being weighed.

Figure 4A:
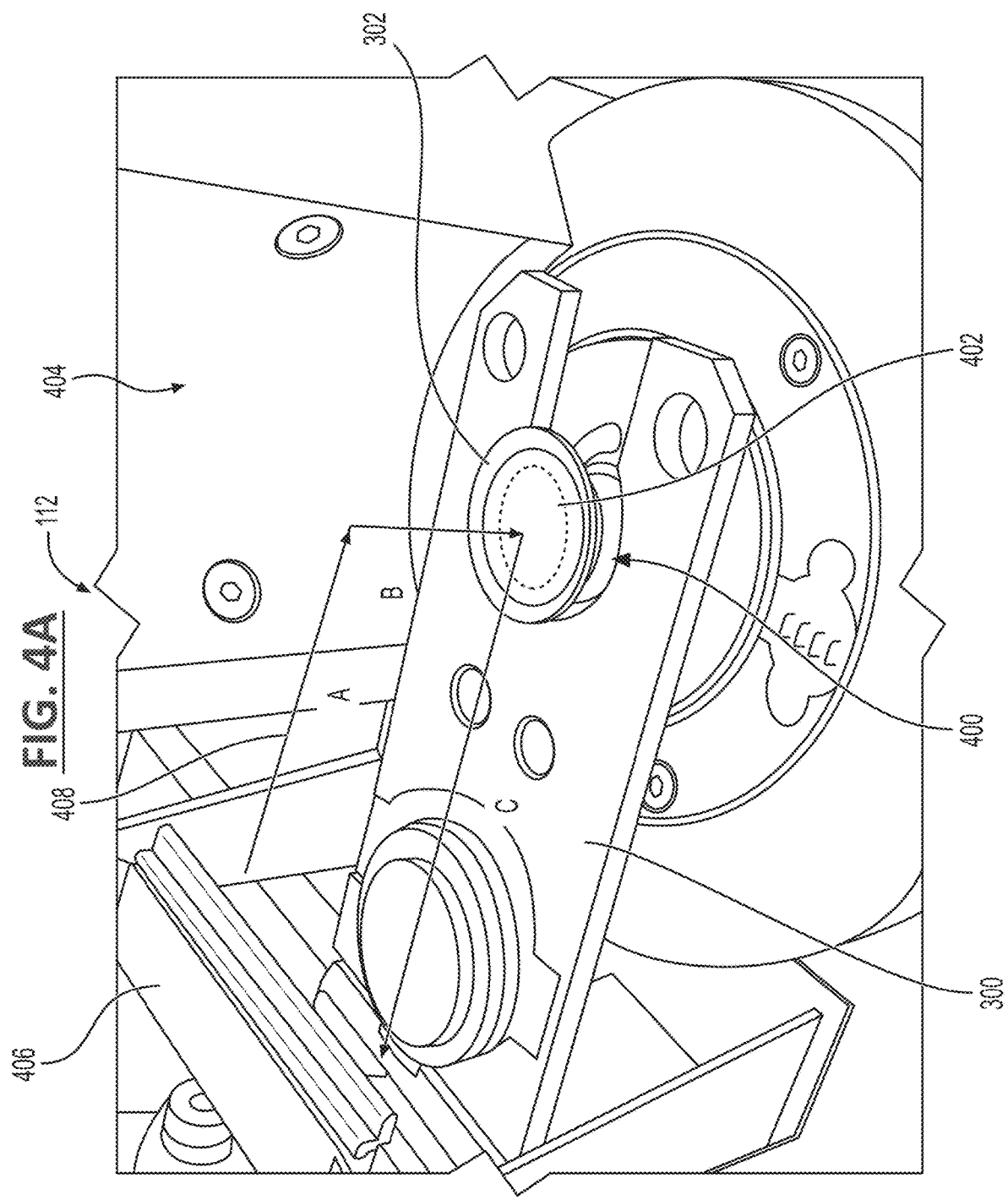
Figure 4B:
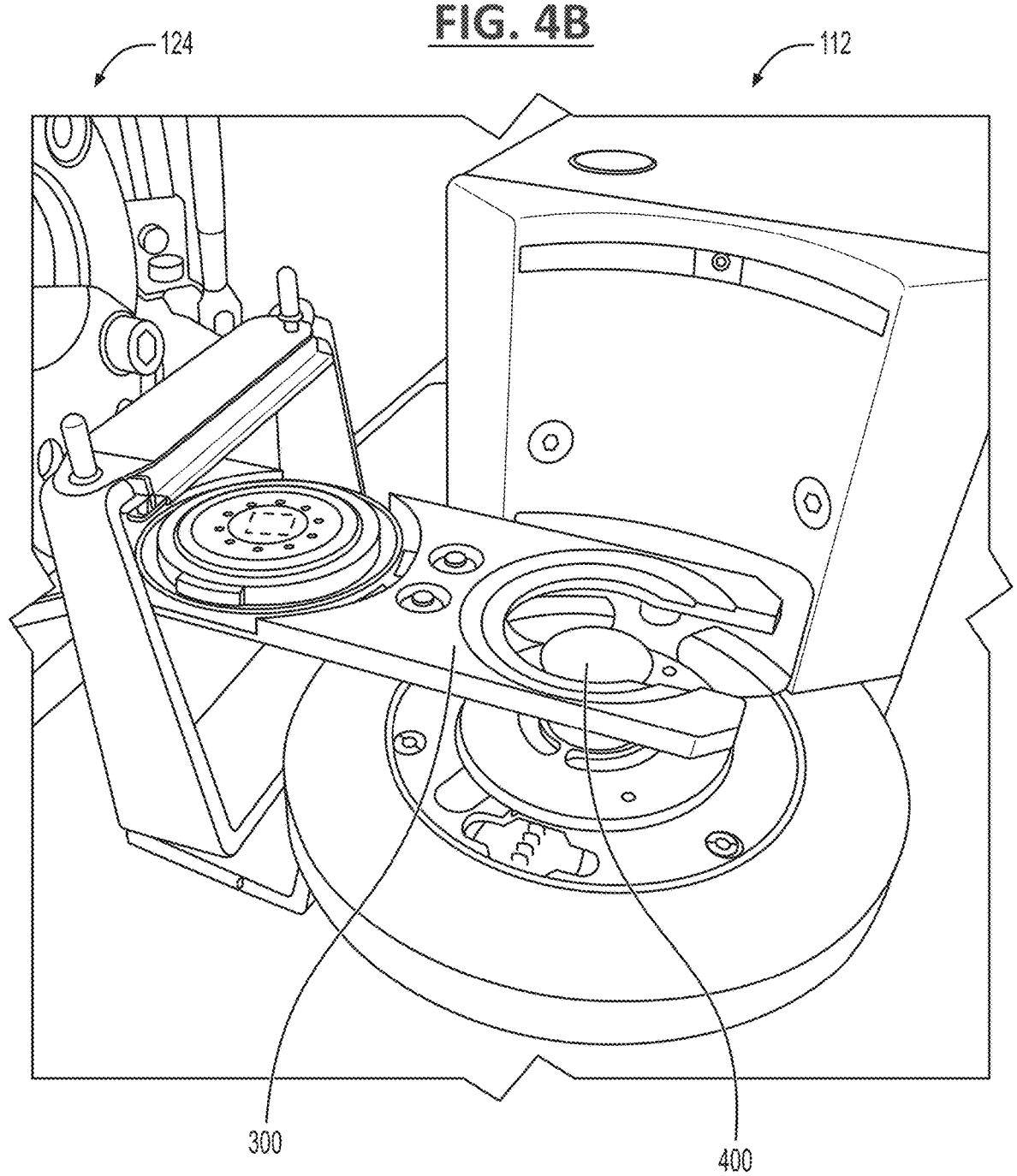

The robotic arm 124 makes a three-part motion 408 represented by three arrows A, B, and C in FIG. 4A. First, the robotic arm moves the filter sample 302 (more specifically, the tray 300 holding the filter sample 302) forward to pass it by the radiation source 406 (arrow A). The robotic arm moves the tray 300 forward until the filter sample 302 is positioned precisely above the position of the weighing pan 400 (for example, when the center of the filter sample 302 aligns with the center of the weighing pan 400) as shown in FIG. 4B. For clarity, FIGS. 4B through 4E do not show the filter sample 302 in order to show the position of the weighing pan 400.

Then, the robotic arm lowers the tray 300 (arrow B) such that the bottom of the filter sample 302 contacts the weighing pan 400, as shown in FIG. 4C. The robotic arm continues lowering the tray 300 (see FIG. 4D) until the filter sample 302 is completely removed from the tray and comes to rest on the weighing pan 400, as shown in FIG. 4A. The weighing pan 400 has a diameter 410 (that is, the maximum diameter measured from one end to another of the weighing pan's outer periphery) that is less than the diameter 316 of the slot 318, which enables the tray 300 to be lowered beneath the weighing pan without coming into contact with the weighing pan 40. For comparison, if the different diameters of the filter samples 302 include 25 mm, 37 mm, and 47 mm, the different types of weighing pan 400 may have diameters of about 20 mm, 30 mm, and 40 mm, respectively, for example, in order to stably receive the appropriate filter sample while not interfering with the tray 300 holding it.

Once beneath the weighing pan 400, the tray 300 is retracted (arrow C). FIG. 4E shows the tray 300 being partially retracted to allow the weighing apparatus 112 to weigh the filter sample 302 positioned on the weighing pan. In some examples, the weighing pan 400 is positioned on a pedestal 412 which has a width less than the diameter 410 of the weighing pan. The slot 318, or more specifically the parallel opening 328 thereof, has the opening width 332 greater than the width of the pedestal 412 such that the tray 300 can be retracted without having any portion of the tray (including the arms 320A and 320B) coming into contact with any portion of the pedestal 412 during the process.

In some examples, the weighing apparatus 112 is any suitable microbalance (with a resolution of 1 μg and repeatability of 1 μg, for example) capable of measuring the weight of the filter samples 302 in sufficient accuracy, including but not limited to a Mettler Toledo XS3DU microbalance. The weighing apparatus 112 may be situated on a base 128 which is an epoxy block on top of a marble table 126, for example, for improved stability and accuracy of measurement by minimizing the impact of external vibrations.

FIGS. 5A and 5B show a method 500 in some implementations for operating the automated filter management system 110 and the weighing apparatus 112 according to embodiments disclosed herein. The method 500 may be implemented using the control system 106, or more specifically the processor 200 which performs the method 500 according to the instructions stored on the non-transitory computer-readable storage medium, or the memory unit 202. In step 502, a transport tray (with the specific filter sample placed on it as determined by the controller, for example) is picked up using a robotic arm from the rack in which the filter samples are stored. In step 504, the identifier code of the filter sample that is located either on the cartridge associated with the filter sample or on the tray holding the filter sample is scanned using any suitable means such as a scanner or camera, for example. In step 506, the static charge on the filter sample is removed using the radiation source.

In step 508, the stability and accuracy of the weighing apparatus is confirmed before and after placing the filter sample on the weighing pan. In step 510, the filter mass is recorded, and in some examples as further disclosed herein, additional measurements can be taken using the different subsystems by transporting the filter sample to these subsystems by the robotic arm. Some of the other measurements taken include the amount of light absorption, light scattering, and fluorescence, among others.

In step 512, replicate data is collected, as suitable. In some examples, repeat measurements of the same filter to obtain replicates is beneficial in obtaining more reliable measurement data pertaining to the filter, such as by normalizing the average mass of the filter on a daily basis. Steps 504, 506, 508, 510, and 512 may be repeated as often as suitable to produce such replicate data. In step 514, the summary statistics for the filter sample is generated for analysis. In step 516, the tray with the filter sample is returned to the rack by the robotic arm after all the measurements are completed. Then, in step 518, the next filter sample to weigh is determined by the controller, after which the method 500 repeats for the next filter sample.

Referring to FIG. 5B, step 508 may be represented by steps 520, 522, 524, 526, and 528. Specifically, in step 520, the balance of the weighing apparatus is tared, after which, in step 522, the controller determines whether the balance is stable. If the balance is not stable, step 520 is repeated, and if the balance is stable, the controller determines in step 524 if the balance reads zero. If the balance does not read zero, step 520 is repeated again, and if the balance reads zero, the controller proceeds to step 526 in which the filter sample is placed on the weighing pan of the weighing apparatus. The controller determines if the balance is stable again in step 528. If the balance is not stable, step 526 is repeated by removing the filter on the weighing pan and placing it on the weighing pan again. If the balance is stable, the controller proceeds to step 530 in which the filter mass is recorded.

Step 530 is part of step 510, and in some examples, the step 530 may include additional steps such as picking up the transport tray and transporting it to a different station or subsystem within the enclosure for further measurement and analysis. After all such measurements are performed, in step 532, the transport tray is picked up by the robotic arm again. In step 534, the controller determines if all replicates are collected. If it is determined that there are more replicate(s) to be collected, the controller returns to step 504 to repeat the steps therefrom. If it is determined that all the necessary replicates are collected, the controller proceeds to step 514, which is previously discussed.

(e) Chemical Analysis Apparatus

Figure 6:
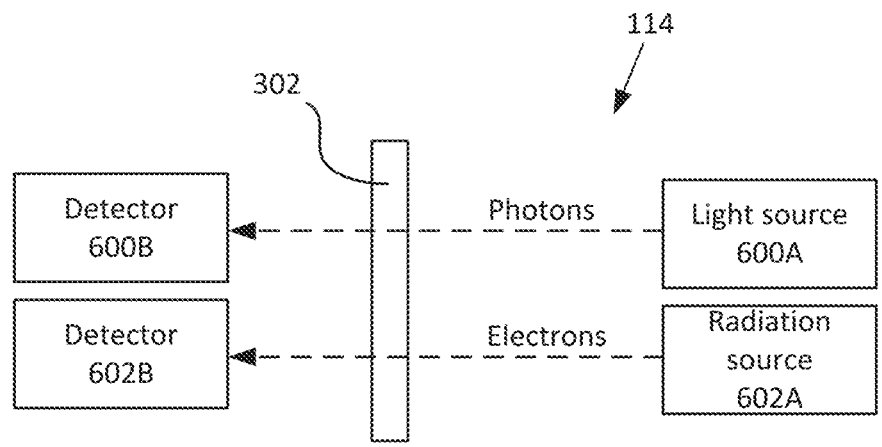
FIG. 6 is a block diagram of a chemical analysis apparatus of the automated analysis system of FIG. 1A according to embodiments disclosed herein.

Referring to FIG. 6, the chemical analysis apparatus 114 includes at least one apparatus for performing electromagnetic energy spectroscopy measurements on the filter sample 302 which passes through it. In the drawing as shown, there are two such apparatuses: a primary apparatus 600 for taking measurements on optical absorption spectroscopy and a secondary apparatus 602 for taking measurements on atomic emission spectroscopy. Each of the apparatus has a source and a detector, where the source (light source 600A or radiation source 602A) emits photons or electrons, which either pass through or are deflected by the filter sample 302, and the detector (600B or 602B, respectively) is capable of detecting how much of the transmitted photons/electrons passed through or were deflected by the filter sample 302. In some examples, there may be additional apparatus(es) for taking measurements on atomic absorption spectroscopy, optical scattering, and/or fluorescence of the filter sample. In some examples, black carbon measurement is performed. In some examples, the transport trays 300 may be configured to facilitate performing such electromagnetic energy spectroscopy measurements to the filter samples 302. For example, the transport tray may have the slot 318 (or the parallel opening 328 and the circular opening 330 thereof) configured such that the photons or electrons as emitted from the source are capable of passing through or deflected by the filter sample that is positioned between the source and the detector while the filter sample is disposed on the transport tray. As such, the transport tray is configured to reduce the likelihood of any portion of the transport tray interfering with the measurements, since no portion of the transport tray affects or interrupts the direction of the photons or electrons between the paired source and detector.

Black carbon (BC) is a component of particulate matter generated during incomplete combustion of carbonaceous fuels. Black carbon has been linked to adverse health and climate effects, and it is therefore of interest to those who study and monitor air quality. A common approach to quantifying BC on filters is to measure the transmission and/or absorption of light, often at a wavelength of 880 nm. Although there are known limitations to an optical transmission approach, the measurement's non-destructive nature makes the approach attractive. Optical methods for estimating black carbon are based upon calculating light attenuation (ATN) from a set of differential measurements, as shown in Equation 1:

$$ATN = 100 * \ln\left(\frac{I_0}{I}\right) \quad \text{(Equation 1)}$$

where BC is defined according to Equation 2:

$$BC = \frac{ATN}{MAC} \quad \text{(Equation 2)}$$

where $I_0$ is the intensity of light passing through a clean (unused) filter, I is the intensity of light passing through a filter laden with PM, and MAC is the mass-absorption cross-section.

The mass of accumulated black carbon, typically reported in units of μg/cm² of active filter surface, can be calculated by applying the mass-absorption cross-section for BC on the filter. These values tend to be specific for a given filter type and can vary by source as well. Although several commercially-available instruments can reliably characterize black carbon using the optical transmission approach, the optical BC system as disclosed herein enable seamless integration into the automated analysis system 100. The optical BC system includes a tungsten halogen laser source and wideband spectrometer connected through fiber-optic cables. The laser source and spectrometer can emit and detect 260-2000 nm and 350-1000 nm light, respectively. In some examples, the optical system uses 880 nm light to quantify BC, but any suitable additional wavelengths may be analyzed to expand the particle characterization capabilities.

As explained above, BC analysis is only one of the many possible analyses which may be performed by installing the appropriate apparatuses inside the enclosure 102. For example, an apparatus for optical absorption spectroscopy may be implemented to measure how much light (photons) is absorbed by a filter sample over a range of optical wavelengths that are defined by the electromagnetic spectra. The intensity of the absorption, known as the absorption spectrum, is measured across the electromagnetic spectrum after which analysis is performed to determine the presence of a particular substance in the filter sample as well as the quantity/amount thereof in the filter sample. Any type of such spectroscopy, including but not limited to X-ray absorption spectroscopy, ultraviolet-visible absorption spectroscopy, infrared absorption spectroscopy, microwave absorption spectroscopy, etc., may be implemented.

In another example, an apparatus for atomic emission spectroscopy, including but not limited to inductively coupled plasma atomic emission spectrometer or laser-induced breakdown spectrometer, may be implemented to measure the quantity of an element in the filter sample by exciting the filter sample using the intensity of light emitted from a suitable source at predetermined wavelength(s). In yet another example, an apparatus for atomic absorption spectroscopy, including but not limited to flame atomic absorption spectrometer or graphite furnace atomic absorption spectrometer, may be implemented such that electromagnetic radiation can be applied from a light source and the quantity of an element in the filter sample can be measured by determining the absorbances of the radiation by the filter sample, where different atoms absorb different radiation wavelengths. In some examples, more than one type of such spectroscopy may be implemented within the sealed enclosure to increase the accuracy of the measurements or to provide confirmation regarding whether the measurements are correct. The robotic arm may thus be able to transport the filter sample from one station (for a first measurement) to a second station (for a second measurement) and, in some examples, even to a third or fourth station(s), etc., for further measurements, where each of the stations is situated within the reach of the robotic arm, before the filter sample is returned to the rack. The controller can then determine the type and amount of the accumulated mass in the filter sample based on the results from such spectroscopy measurement(s) as disclosed herein.

(f) Filter Tracking

Figure 7:
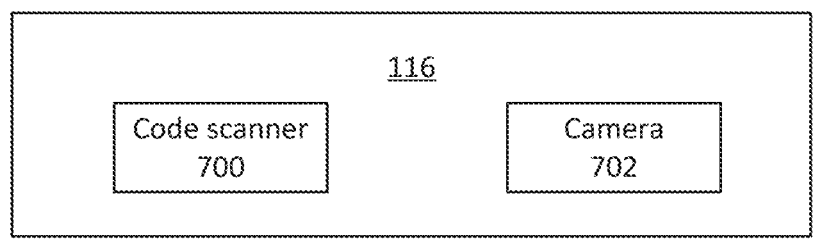
FIG. 7 is a block diagram of a sample tracking system of the automated analysis system of FIG. 1A according to embodiments disclosed herein.

In some examples, each filter is assigned a unique identification (ID) code 312 such as a barcode, a quick response (QR) code, or any other suitable type of ID code as known in the art. In some examples, the ID code 312 is associated with a filter by placing a sticker on either a filter storage dish (for example, the container for the filter sample 302) or a sampling cartridge 304 associated with the filter sample 302, as shown in FIGS. 3C and 3E. Referring to FIG. 7, the sample tracking system 116, therefore, includes a code scanner 700 such that, before every measurement, the robotic arm may move the ID code under the code scanner 700 to read the ID of the filter sample and tie the filter sample ID with the ID associated with the subsequent measurement.

In some examples, the sample tracking system 116 may also use a camera 702 to take a photograph/image of each filter sample during the weighing process. These images may provide traceability information for each sample. In some examples, the images have any suitable and sufficient resolution such that a person reviewing the images, or a computing device analyzing the images (e.g., using artificial intelligence or machine learning to perform image analysis), may detect filter defects and/or particle deposition from such images.

(g) Environmental Control

Figure 8:
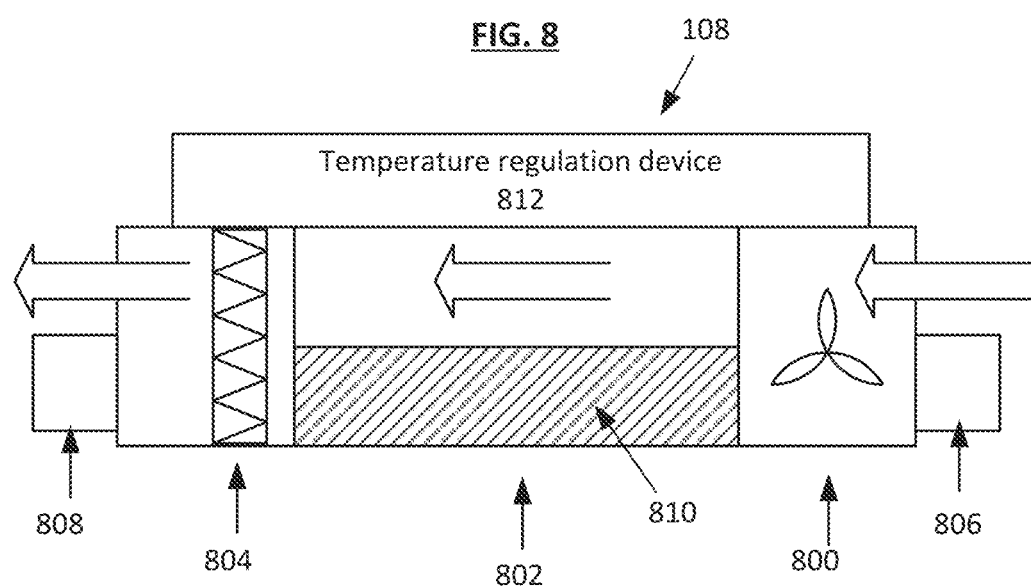
FIG. 8 is a block diagram of an environmental control system of the automated analysis system of FIG. 1A according to embodiments disclosed herein.

Referring to FIG. 8, the environmental control system 108 includes a fan 800, a humidification chamber 802, and a particle air filter 804, positioned such that air enters the system 108 via the fan 800, passes through the humidification chamber 802 which contains saturated salt solution 810 for humidity control, and exits through the particle air filter(s) 804 (for example, a high-efficiency particle air, or HEPA, filter), in what may be referred to as a "flow-through humidification and air filtration system" as determined by the direction in which the air is blown using the fan. In some examples, there may be a temperature regulation device 812 such as an air conditioner to control the temperature such that the temperature remains within a predetermined range. In some examples, there may be an inflow sensor 806 and an outflow sensor 808 to measure the air coming in and exiting from the system 108. In some examples, the sensors 806 and 808 may include thermometers, humidity monitors, and/or real-time particle matter sensors (to monitor background pollution levels to minimize the risk of filter contamination), for example, which may be coupled with the control system 106 such that, when the measurements detected by the sensors are beyond a predetermined threshold, the control system 106 may automatically activate the environmental control system 108 to keep the measurements within the predetermined threshold or range of thresholds. In some examples, the sensor measurements are taken and recorded at a predetermined frequency, for example every thirty minutes when the robotic arm is idle, or simultaneously with each measurement (for example, weighing the filter sample) that is being performed.

Variations in environmental conditions when weighing filters can change the mass of filters and the performance of the balance itself. The United States EPA weighing protocols, for example, require the microbalance and filters to be at 20-23° C. with less than 2% variability and 30-40% with less than 5% variability relative humidity (RH) for at least 24 hours before the filters are weighed. As such, the enclosure 102 in some examples may require temperature regulation, although such is not necessary when the room in which the automated analysis system 100 is installed is always maintained within the required temperature range. The saturated salt solution 810 may be used to control RH within the enclosure. A saturated salt solution facilitates maintaining a consistent RH level (for a given atmospheric pressure and temperature) based upon the vapor pressure of the salt solution used. A saturated salt solution may emit water when humidity levels are low and absorb moisture in high humidity conditions. A magnesium chloride solution (e.g., powdered magnesium chloride mixed with deionized water to form a saturated solution) may be employed as the saturated salt solution, which may be selected due to the solution theoretically providing a stable RH of approximately 35%, for example. When the ambient RH inside the enclosure is lower than this level, moisture may be released from the salt solution to maintain the target level. In some examples, the saturated salt solution 810 may be replaced or refilled at a regular basis, for example once or twice a month, depending upon the ambient conditions and the usage frequency of the system.

Referring to FIGS. 9A and 9B, a method 900 of operating the environmental control is disclosed. The control system receives environmental sensor measurements in step 902. In step 904, the measurements are compared with threshold values. Step 904 may be implemented as step 912 in which the humidity or particle matter is analyzed to determine if the measured value of humidity or particle matter is within threshold. If so, the method returns to step 902, otherwise the method proceeds to step 906. In step 906, the fan is activated to pass air through the humidification chamber and particle air filter if it is determined that the measurements exceed the threshold values or range of threshold values. In step 908, the updated sensor measurements are received. In step 910, the control system confirms whether the updated sensor measurements are within the threshold values or range of threshold values. Step 910 may be implemented as step 914, in which the control system determines whether the humidity or particle matter is within the threshold level. If it is determined that the updated measurements of humidity or particle matter are within the threshold values, the method 900 returns to step 902, otherwise the method 900 returns to step 906 to reactivate the fan.

Referring to FIG. 10, a method 1000 of performing automatic filter sample analysis on a sample using the automated sample analysis system 100 is disclosed. In step 1002, the filter sample is transported from the storage rack to the filter weighing apparatus and to the chemical analysis apparatus, using the automated filter management system as controlled by the control system. In step 1004, data is obtained by the control system from the filter sample analysis system. In step 1006, the type and amount of accumulated mass in the filter sample are determined by the control system based on the weight and a result of the electromagnetic energy spectroscopy measurement. In step 1008, the identity of the filter sample is identified by the system, using the scanner to scan the ID code associated with the filter sample. In step 1010, data is recorded and managed by the control system based on the identity of the filter sample. In step 1012, the filter sample is returned to the storage rack using the automated filter management system.

Evaluation of System Performance

Performance of each subsystem within the automated analysis system 100 is evaluated using the method as disclosed herein.

With regards to the gravimetric analysis performed by the weighing apparatus 112, the vibration control efficacy (i.e., marble table and epoxy block) is evaluated by using the built-in microbalance stability readings to determine the typical time required to get a stable reading. The stability status of the microbalance was recorded every two seconds for a 72-hour period. The typical time between two consecutive stable readings is determined. The time between stable readings can be used to estimate how long the system would need to wait before a reliable measurement could be collected. Measurement precision was quantified through repeated measures of polytetrafluoroethylene (PTFE) membrane filters (for example PT25P, Measurement Technology Laboratories, Minneapolis, MN USA). Repeated measurements of five (5) filters were collected over 35 days. For each weighing session, three measurements for each filter were collected. The average mass change is determined for each filter from day one (long-term stability) and the range in measurements recorded for each filter on each subsequent measurement day (short-term stability). A typical performance metric for gravimetric analysis is the limit of detection (LOD), which can be calculated as three times the standard deviation of "blank" filter mass change. LODs are calculated at the daily, weekly, and approximate monthly level based on this repeated-measures experiment.

Gravimetric Measurements

Figure 11:
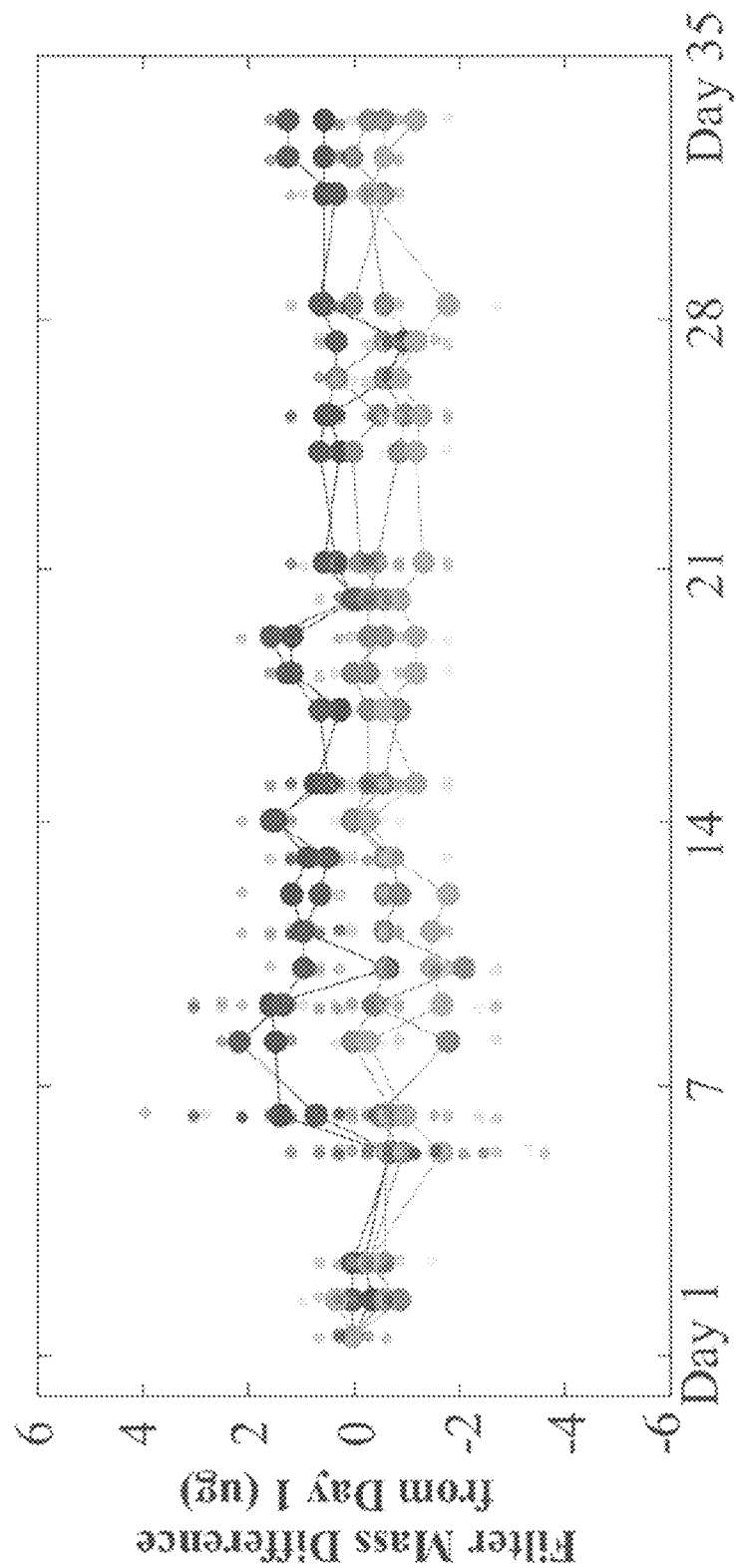
FIG. 11 is a diagram comparing filter mass difference as measured in different days using the automated analysis system according to embodiments disclosed herein.

Results for gravimetric measurement stability are shown in FIG. 11. The change in filter mass, for each of five filters, was compared to the average mass for each respective filter on day 1. The average absolute mass change from day 1 (i.e., mass difference on any given day compared to day 1) was 0.8 µg±0.5 µg (N=125); substantially less than the 15 µg requirement specified by the United States EPA. Across the 35 days of repeated measurements, each filter's average mass change remained within 4 µg of the mass on day 1 with no discernable systematic drift over time. As such, the maximum mass change is less than 6 ug, and the average mass change is less than 4 ug according to the results. In FIG. 11, each large circle represents the average of three measurement replicates per day and is normalized to the average mass of that filter on day 1. The smaller circles indicate the individual measurement replicates.

Figure 12:
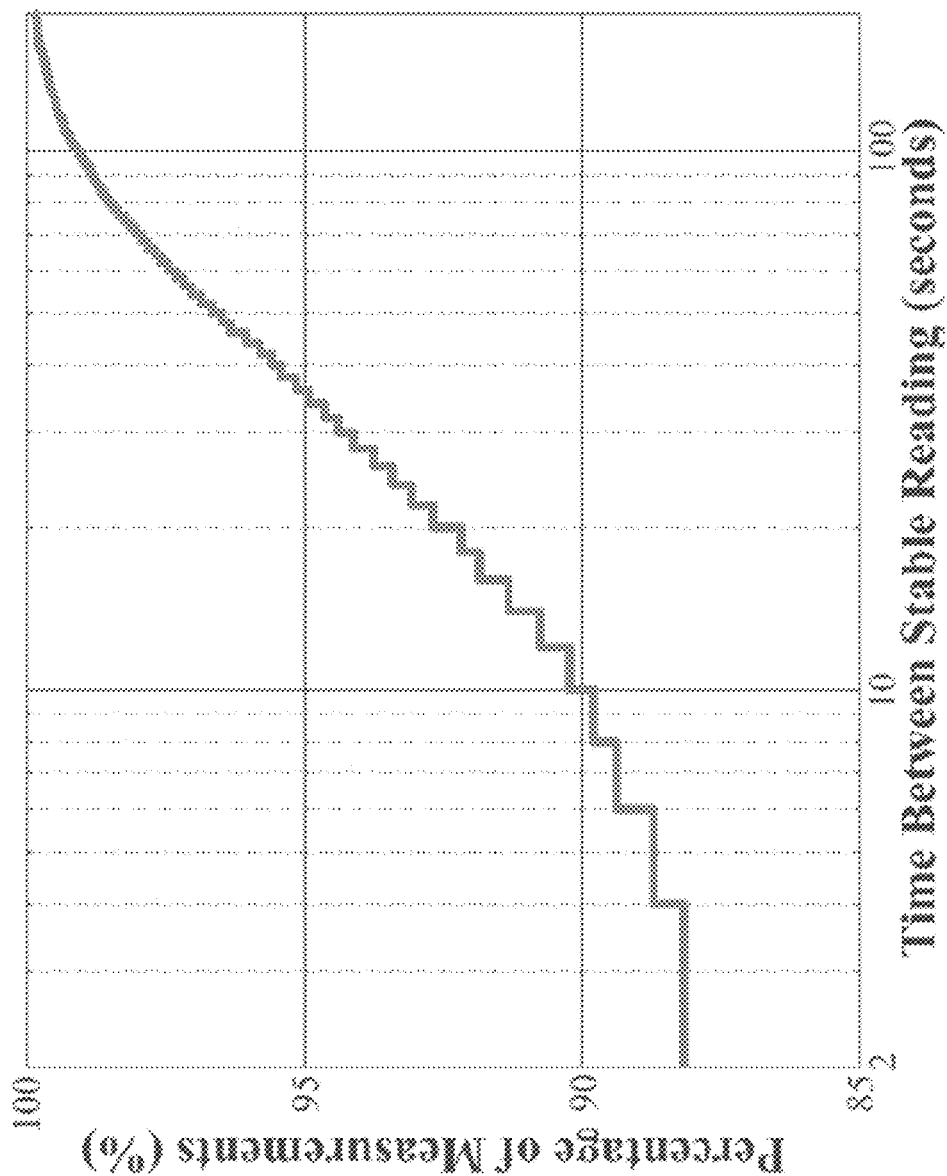
FIG. 12 is a cumulative distribution function plot of time between stable reading using the automated analysis system according to embodiments disclosed herein.

The precision of a microbalance degrades when operated in a room with excessive vibration. Balance sensitivity is evaluated to external conditions by recording stability status every two seconds for 72 hours. The area near the system 100 had individuals completing routine laboratory activities for approximately half of those 72 hours. The microbalance reported a stable reading 90% of the time within 10 seconds for typical work hours and 97% of the time within 60 seconds, as shown in FIG. 12, which is the cumulative distribution function plot of time between stable readings. As shown in FIG. 12, in some examples, at least 87% stability may be achieved within 2 seconds, at least 90% within 10 seconds, at least 95% within 40 seconds, and at least 97% within 60 seconds. By programmatically waiting for a stable balance reading, the system 100 can collect quality measurements even in a room used for other activities.

The detection limit of the system 100 was estimated by looking at the change in filter mass across subsequent measurements. Although LODs are typically measured using filter blanks (i.e., filters with no loading), an important metric is the mass change of a filter over time. LOD was estimated by calculating three times the standard deviation of mass change for the five filters across time. The average LOD was 2.7 μg (max: 5.1 μg; min: 0.7 μg), with no discernable systematic drift over time. The low LOD indicates that the system 100 would be appropriate for measuring filters used in studies with relatively low total particulate matter loading, assuming gravimetrically stable filters and proper handling protocols are used during filter collection. It is worth noting that detection limits from field studies will be influenced by other considerations such as handling and transportation of filter.

Optical Black Carbon

With regards to the BC analysis performed by the chemical analysis apparatus 114, the Magee Scientific SootScan™ is one example of a commercial instruments for optical analysis of black carbon. The optical BC system's performance is evaluated in terms of agreement with the SootScan™ and repeatability of replicate measurements. Attenuation is determined for eight (8) neutral density disks, twenty-two (22) 37-mm Teflon membrane, and twenty-two (22) 37-mm Teflon coated glass-fiber filters. Filter samples were loaded with PM emitted from burning wood and diesel emissions, and each filter was measured using the SootScan™ and the optical BC system as disclosed herein, before PM loading and also after PM loading. Pre-loading measurements were collected to account for filter material variability. The attenuation of ten (10) membranes and ten (10) glass-fiber filters was measured five (5) times after loading to evaluate measurement repeatability.

Figure 13:
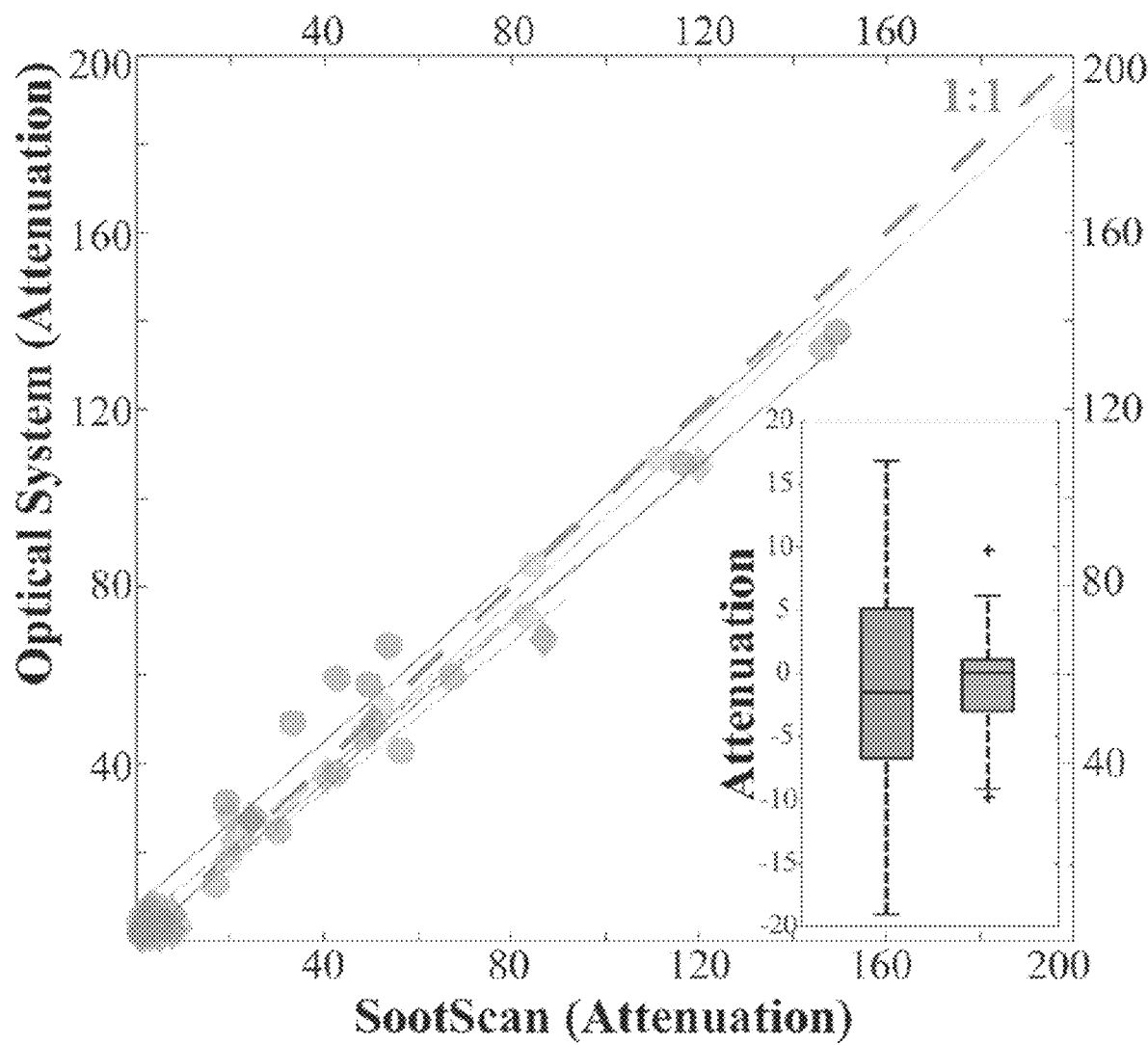
FIG. 13 is a diagram comparing correlations between the attenuation of the optical system the automated analysis system according to embodiments disclosed herein and a previous known system.

Black carbon quantification accuracy was evaluated by comparing loaded filter attenuation as determined by the optical BC system to that of SootScan™. A total of 32 comparisons were made: 8 neutral density glass disks, 22 Teflon membrane filters, and 22 Teflon coated glass-fiber filters (N total=52). Each of the filters was evaluated before and after loading with PM to account for potential inter-filter variability. Method agreement was quantified in terms of a Pearson's coefficient (r) and the slope/y-offset of a least-squares fit regression line. A strong linear relationship was found for the three material types tested, all with $0.84 > slopes > 0.98$, as shown in FIG. 13. In FIG. 13, eight neutral density disks and twelve of each of the filter media types were evaluated; MTL wood smoke: n=12, MTL diesel smoke: n=10, Emfab wood smoke: n=12, Emfab diesel smoke: n=10, Neutral density disk: n=8. Variation in repeated attenuation measurements are also shown. Plus symbols represent outlier points.

For example, according to the data that was obtained, Neutral Density Optical Disks achieved r=0.998 with equation y=0.97x−0.96, 37-mm MTL PTFE membrane (wood smoke) achieved r=0.996 with equation y=0.89x−0.05, 37-mm PallFlex Emfab (wood smoke) achieved r=0.985 with equation y=0.89x+9.32, 37-mm MTL PTFE membrane (diesel smoke) achieved r=0.990 with equation y=0.86x+2.91, and 37-mm PallFlex Emfab (diesel smoke) achieved r=0.986 with equation y=0.84x−0.77.

Environmental Control

Efficiency of the environmental control system was evaluated by analyzing the trends in temperature, humidity, and background PM levels over time. Temperature and humidity were compared against EPA requirements. Although there are not strict EPA guidelines for control of background air quality during gravimetric analysis, monitoring of enclosure air quality (and use of an internal HEPA filter) may be an important quality metric for the system 100 in some examples.

Figure 14:
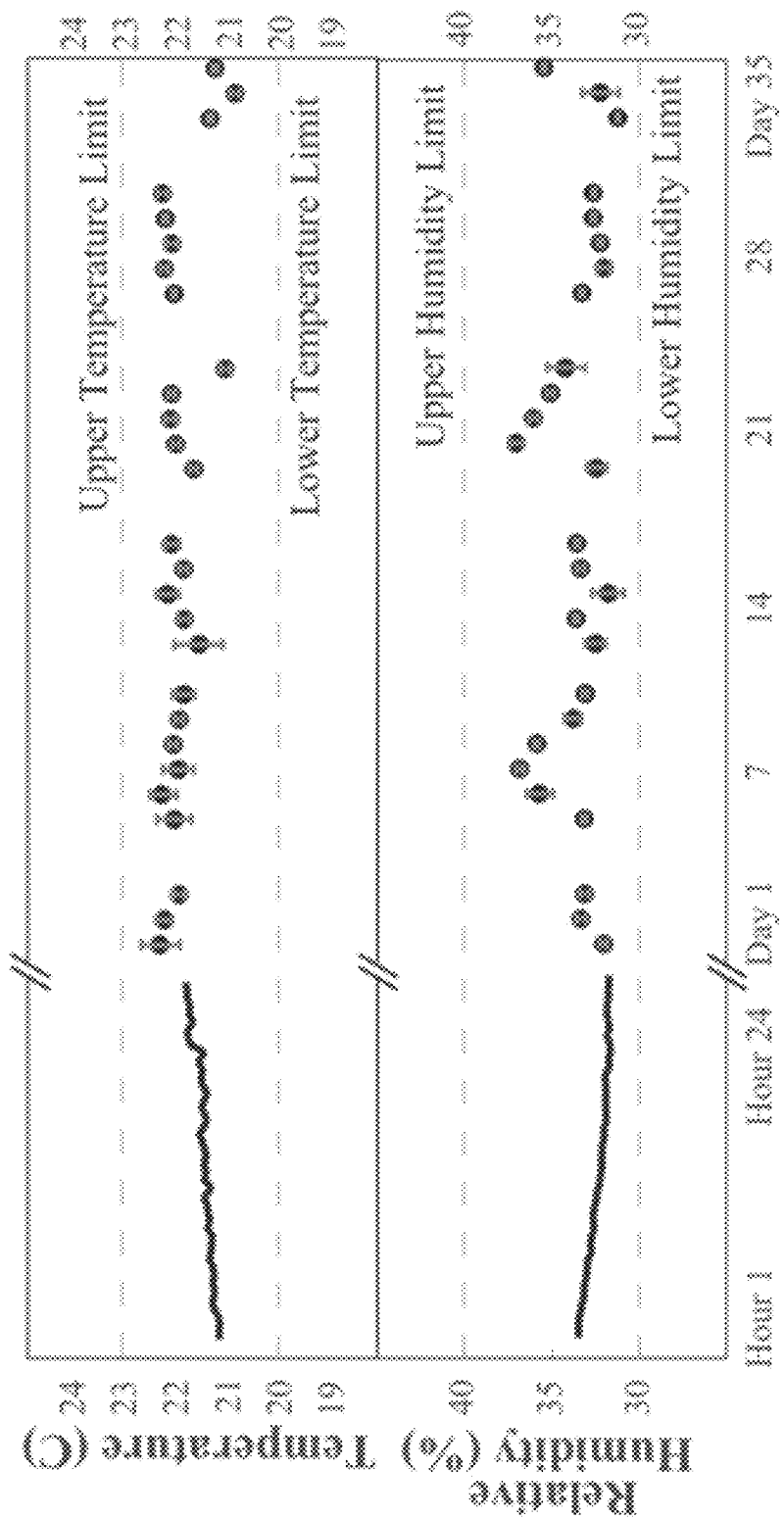
FIG. 14 is a diagram comparing mean temperature and humidity conditions within the automated analysis system according to embodiments disclosed herein.

Short-term and long-term temperature and humidity stability within the system 100 were measured. Measured temperature and humidity were within EPA specifications for both 24 hour periods and periods spanning multiple weeks, as shown in FIG. 14. In the figure, mean temperature and humidity conditions within the system 100 are shown. Temperature and humidity conditions measured every 30 minutes for 24-hours and as well as anytime filters were equilibrating in the system for over 35 days. Gaps in the time series are days the system was in "idle mode" and no filters were equilibrating. Error bars represent+/−1 standard deviation of measurements collected on that day. The largest variations in relativity humidity corresponded to the days after water addition to the salt solution. Decreasing the amount of water added to the salt solution on any given day but increasing the frequency of addition could reduce variability. Outdoor temperatures and relative humidity conditions varied from −17° C. to 23° C. and 0% to 100%, respectively, during the testing window.

The environmental control and filtration system has a nominal flow rate of approximately 300 L/min when running; the blower is off while a filter is on the microbalance to minimize air currents within the system 100. While the blower is on, this flow rate equates to 4.6 air exchanges per hour through the HEPA filter. The average PM2.5 concentration, as reported by the SPS30, over a 72-hour period was 1.3±0.7 μg. Although low-cost real-time PM monitors have known limitations, the SPS30 is sufficient for ensuring that extensive infiltration of particles into the system 100 is not occurring. The time in which the doors of the system 100 are open is minimized, typically to load or unload filters, to reduce the risk of external particles entering the system.

Robotic Arm

With regards to the automated filter management system 110, the six-axis robotic arm 124 departs from conventional design of commercial automated weighing systems which incorporate a two-axis Cartesian robot for component transfer. Cartesian robots generally are easy to program and can provide advantages when aligning components. However, the fixed motion range of Cartesian robots can be limiting if seeking to expand or modify a system. Additionally, Cartesian robot movement often comes from rack and pinion or gear and belt designs which raises concerns for filter contamination because debris and small particles can form as these moving parts abrade over time. The use of external seals may be required to mitigate this impact. While the multi-axis robot arm also includes gears and moving parts, the wearing parts are sealed within the joints of the robotic arm, which may provide the advantage of simplifying the sealing process. A multi-axis arm also allows flexibility in component placement within the system 100 and facilitates expansion of the system to include other measurement techniques as suitable.

Usability

The system 100 is designed to collect quality gravimetric filter data and minimize the labor burden on laboratory personnel. Each filter is estimated to require 60 seconds of personnel time. This time includes applying a QR code, loading the filter on a tray, placing the tray in the system, initiating the program, and unloading the filter after weighing. The time required per filter varies slightly with the number of filters being prepared (e.g., the time to initiate the program does not change with the number of filters to be analyzed), but this variation is small. Although external factors such as vibration levels influence the time required to collect a measurement, the system can typically weigh a filter in less than 4.5 minutes. With an estimated total time of 5.5 minutes, the system could theoretically analyze 261 filters per day. The usability of the system can also be qualified in terms of personnel time saved. The system is estimated to take less than 25% of the personnel time required for manual weighing of filters.

Figure 15:
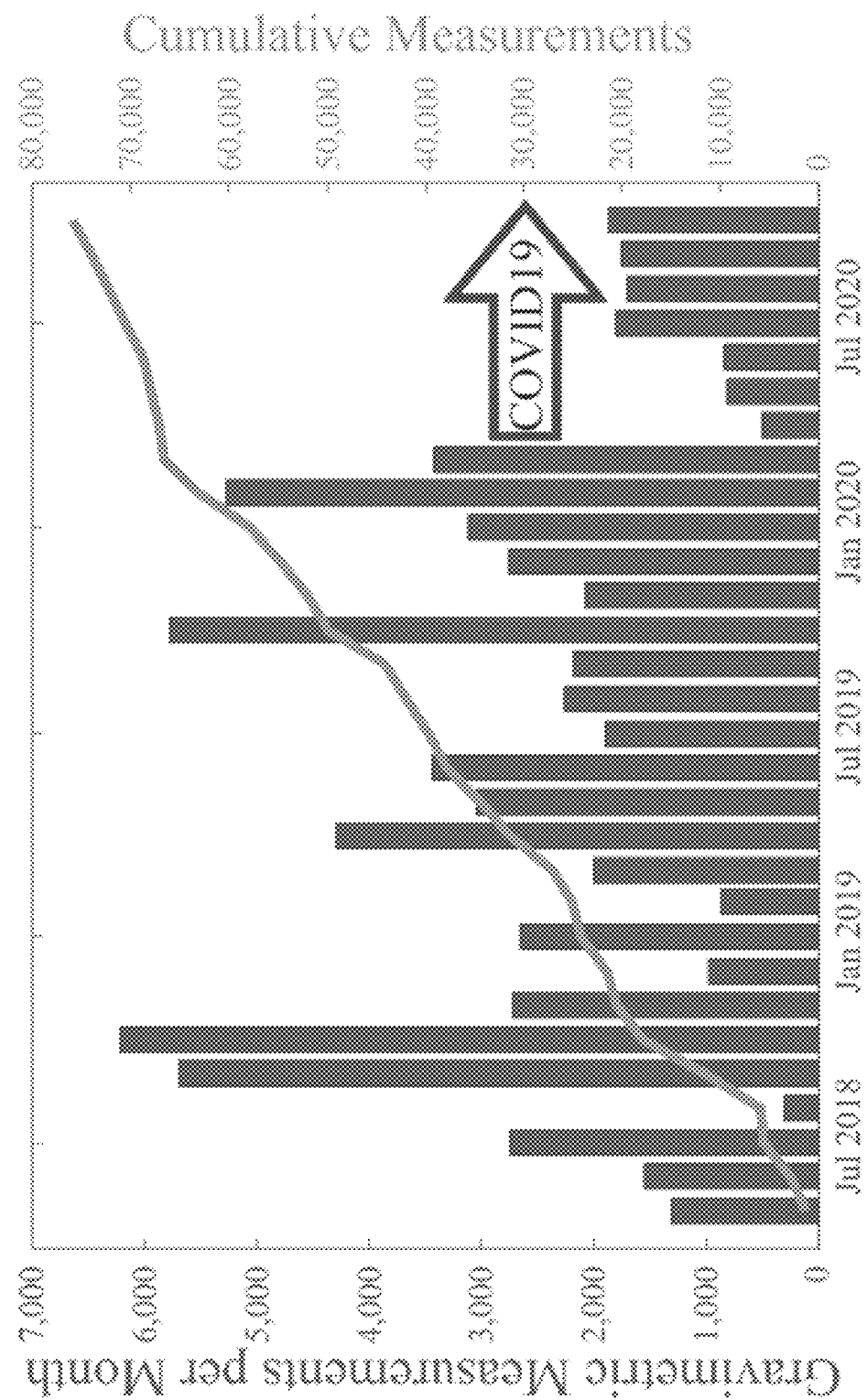
FIG. 15 is a diagram comparing the number of gravimetric measurements collected and the cumulative number of mass measurements collected, both within the same period, using the automated analysis system according to embodiments disclosed herein.

The system 100 has allowed us to decrease the personnel time dedicated to filter preparation. As a result, it allowed us to increase the number of filters collected for the air quality studies. The system has been used to collect nearly 80,000 mass measurements during testing, as shown in FIG. 15, which represents the number of gravimetric measurements collected per month between May 2018 and October 2020 (left axis, associated with the bar graph) and the cumulative number of mass measurements collected in that period (right axis, associated with the line graph). The "on-demand" ability of the system has allowed for large fluctuations in the number of filters processed per month without massive disruptions in personnel schedules. The system has also allowed for research efforts to continue during periods of uncertainty or limited personnel availability such as the COVID19 pandemic.

A high-throughput, robotic system is thus designed to facilitate analysis of gravimetric filters at large volumes. The system 100 as disclosed herein is comprised of readily-available equipment and is assembled using basic construction techniques. The system is designed to measure gravimetric filters per United States EPA guidelines while being configurable for additional non-destructive filter analysis techniques. The aforementioned results show that the system meets the temperature and humidity conditions required by the United States EPA filter analysis protocol and achieves the levels or measurement repeatability necessary for air quality related studies. An automated approach, such as the disclosed system, would allow research groups to allocate valuable personnel time to scientific endeavors instead of the tedious time-consuming process of manually weighing filters.

Various modifications and additions can be made to the embodiments disclosed herein without departing from the scope of the disclosure. For example, while the embodiments described above refer to particular features, the scope of this disclosure also includes embodiments having different combinations of features and embodiments that do not include all of the described features. Thus, the scope of the present disclosure is intended to embrace all such alternatives, modifications, and variations as fall within the scope of the claims, together with all equivalents.

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An automated air quality analysis system comprising:
a sealed enclosure;
a filter sample analysis system disposed within the sealed enclosure, the filter sample analysis system comprising:
an automated filter management system including a filter storage rack comprising a plurality of filter samples and an articulating robotic arm configured to select one of the filter samples for analysis,
a filter weighing apparatus configured to determine a weight of the selected filter sample, and
a primary chemical analysis apparatus configured to perform electromagnetic energy spectroscopy measurement on the selected filter sample; and
a controller operably coupled with the filter sample analysis system, the controller configured to:
operate the automated filter management system to transport the selected filter sample to the filter weighing apparatus and the primary chemical analysis apparatus via a transport tray comprising a slot in which the selected filter sample is disposed for transport and a cartridge holder configured to hold a sampling cartridge associated with the selected filter sample for identification,
obtain data from the filter sample analysis system, and
determine type and amount of accumulated mass in the selected sample based on the weight and a result of the electromagnetic energy spectroscopy measurement.

2. The automated air quality analysis system of claim 1, wherein the robotic arm is configured to transport the selected filter sample from the filter storage rack to at least one of the filter weighing apparatus and the primary chemical analysis apparatus and subsequently return the selected filter sample to the filter storage rack.

3. The automated air quality analysis system of claim 2, wherein:
the primary chemical analysis apparatus is configured to perform optical absorption spectroscopy measurement on the selected filter sample, and
the filter sample analysis system further comprises a secondary chemical analysis apparatus configured to perform atomic emission spectroscopy measurement on the selected filter sample.

4. The automated air quality analysis system of claim 3, wherein the filter sample analysis system further comprises a tertiary chemical analysis apparatus configured to perform atomic absorption spectroscopy measurement on the selected filter sample.

5. The automated air quality analysis system of claim 4, wherein the robotic arm is configured to transport the selected filter sample to the secondary and tertiary chemical analysis apparatuses before returning the selected filter sample to the filter storage rack.

6. The automated air quality analysis system of claim 5, wherein the controller is configured to determine the type of the accumulated mass in the selected sample based on results of the optical emission spectroscopy measurement, the atomic emission spectroscopy measurement, and the atomic absorption spectroscopy measurement.

7. The automated air quality analysis system of claim 4, wherein the primary, secondary, and tertiary chemical analysis apparatuses are located in different sections within the sealed enclosure within reach of the robotic arm.

8. The automated air quality analysis system of claim 1, wherein the sampling cartridge includes an identification code for uniquely identifying and tracking the selected filter sample from among the plurality of filter samples.

9. The automated air quality analysis system of claim 8, wherein the filter sample analysis system further comprises a scanner configured to scan the identification code, and the controller is configured to determine an identity of the selected filter sample based on the scanned identification code and associate the determined type and amount of the accumulated mass with the identity of the selected sample.

10. The automated air quality analysis system of claim 9, wherein the filter sample analysis system further comprises a camera configured to record image data of the selected filter sample for at least one of: sample traceability, quality assurance, or damage detection.

11. The automated air quality analysis system of claim 9, wherein the controller is configured to record and manage the data obtained from the filter sample analysis system in a memory unit based on the scanned identification code.

12. The automated air quality analysis system of claim 1, wherein a diameter of the selected filter sample is greater than a diameter of the slot.

13. The automated air quality analysis system of claim 12, wherein the filter weighing apparatus comprises a weighing pan onto which the selected filter sample is positioned, and the diameter of the slot is greater than a diameter of the weighing pan.

14. The automated air quality analysis system of claim 13, wherein the weighing pan is detachable and selectable from a plurality of weighing pans with different diameters to accommodate the diameter of the selected filter sample.

15. The automated air quality analysis system of claim 13, wherein the filter weighing apparatus further comprises a radiation source configured to remove static charge from the selected filter sample before positioned on the weighing pan.

16. The automated air quality analysis system of claim 13, wherein the filter weighing apparatus further comprises a draft shield configured to facilitate reducing an effect of air currents within the sealed enclosure on the determined weight of the selected filter sample.

17. The automated air quality analysis system of claim 1, further comprising an environmental control system disposed within the sealed enclosure and comprising a fan, a humidifier/dehumidifier, and a particle filter, wherein the controller is operably coupled with the environmental control system to control humidity and reduce free-floating particles within the sealed enclosure.

18. The automated air quality analysis system of claim 17, wherein the humidifier/dehumidifier includes a chamber storing therein a saturated salt solution which maintains a predetermined level of humidity within the chamber.

19. The automated air quality analysis system of claim 17, wherein the environmental control system further includes a temperature regulation device to control a temperature within the sealed enclosure.

20. The automated air quality analysis system of claim 1, further comprising a data network operatively coupled with at least one of the controller or the filter sample analysis system for wired or wireless data communication.

21. The automated air quality analysis system of claim 1, wherein the robotic arm is a six-axis articulating robotic arm.

22. The automated air quality analysis system of claim 1, wherein the robotic arm includes a plurality of distally extending holders via which the selected filter sample is transported.

23. The automated air quality analysis system of claim 22, wherein the holders are magnetically attached to a head portion of the robotic arm.

24. A method of operating a filter sample analysis system, comprising:
   selecting, by a controller, a filter sample to analyze;
   operating, by the controller, an automated filter management system to transport the selected filter sample to a filter weighing apparatus and a primary chemical analysis apparatus via a transport tray comprising a slot in which the selected filter sample is disposed for transport and a cartridge holder configured to hold a sampling cartridge associated with the selected filter sample for identification;
   determining, by the filter weighing apparatus, a weight of the selected filter sample;
   performing, by the primary chemical analysis apparatus, electromagnetic energy spectroscopy measurement; and
   determining, by the controller, type and amount of accumulated mass in the selected sample based on the weight and a result of the electromagnetic energy spectroscopy measurement.

25. The method of claim 24, further comprising:
   transporting, by a robotic arm of the automated filter management system, the selected filter sample from a filter storage rack to at least one of the filter weighing apparatus and the primary chemical analysis apparatus; and
   returning, by the robotic arm, the selected filter sample to the filter storage rack.

26. The method of claim 25, further comprising:
   performing, by the primary chemical analysis apparatus, optical absorption spectroscopy measurement on the selected filter sample; and
   performing, by a secondary chemical analysis apparatus, atomic emission spectroscopy measurement on the selected filter sample.

27. The method of claim 26, further comprising:
   performing, by a tertiary chemical analysis apparatus, atomic absorption spectroscopy measurement on the selected filter sample.

28. The method of claim 27, further comprising:
   transporting, by the robotic arm, the selected filter sample to the secondary and tertiary chemical analysis apparatuses before returning the selected filter sample to the filter storage rack.

29. The method of claim 28, further comprising:
determining, by the controller, the type of the accumulated mass in the selected sample based on results of the optical emission spectroscopy measurement, the atomic emission spectroscopy measurement, and the atomic absorption spectroscopy measurement.

30. A non-transitory computer-readable storage medium storing thereon instructions which, when executed by a processor of the controller, causes the processor to perform the method according to claim 24.

31. An automated air quality analysis system comprising:
a sealed enclosure;
a filter sample analysis system disposed within the sealed enclosure, the filter sample analysis system comprising:
an automated filter management system including a filter storage rack comprising a plurality of filter samples and an articulating robotic arm configured to select one of the filter samples for analysis,
a filter weighing apparatus configured to determine a weight of the selected filter sample,
a primary chemical analysis apparatus configured to perform optical absorption spectroscopy measurement on the selected filter sample, and
a secondary chemical analysis apparatus configured to perform atomic emission spectroscopy measurement on the selected filter sample; and
a controller operably coupled with the filter sample analysis system, the controller configured to:
operate the automated filter management system to transport using the robotic arm the selected filter sample to the filter weighing apparatus, the primary chemical analysis apparatus, and the secondary chemical analysis apparatus and subsequently return the selected filter sample to the filter storage rack,
obtain data from the filter sample analysis system, and
determine type and amount of accumulated mass in the selected sample based on the weight and a result of the electromagnetic energy spectroscopy measurement.

* * * * *